United States Patent
Korb et al.

(10) Patent No.: US 12,321,662 B2
(45) Date of Patent: Jun. 3, 2025

(54) SYNCHRONIZING PLAYBACK OF AUDIO INFORMATION RECEIVED FROM OTHER NETWORKS

(71) Applicant: Sonos, Inc, Santa Barbara, CA (US)

(72) Inventors: Cameron Ellison Korb, Boston, MA (US); Nicholas Maniskas, Somerville, MA (US); Ted Lin, Cambridge, MA (US); Meng Wang, Woburn, MA (US); Richard John Bannon, Seattle, WA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 17/677,337

(22) PCT Filed: Sep. 9, 2020

(86) PCT No.: PCT/US2020/049939
§ 371 (c)(1),
(2) Date: Feb. 2, 2022

(87) PCT Pub. No.: WO2021/050546
PCT Pub. Date: Mar. 18, 2021

(65) Prior Publication Data
US 2024/0289086 A1  Aug. 29, 2024

Related U.S. Application Data

(60) Provisional application No. 62/898,194, filed on Sep. 10, 2019.

(51) Int. Cl.
*G06F 3/16* (2006.01)
*H04R 3/12* (2006.01)

(52) U.S. Cl.
CPC ............ *G06F 3/165* (2013.01); *H04R 3/12* (2013.01); *H04R 2227/005* (2013.01)

(58) Field of Classification Search
CPC .. G06F 3/165; H04R 3/12; H04R 5/04; H04R 2227/005; H04R 2420/07; H04R 27/00
USPC ........................................ 381/77–85, 22–23
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Disler Paul
(74) *Attorney, Agent, or Firm* — Akerman LLP

(57) ABSTRACT

Disclosed herein are playback devices, groups of playback devices, and methods of operating playback devices and groupings thereof to cause the playback devices in a group of playback devices communicating over a first network to play audio content received via second network.

20 Claims, 19 Drawing Sheets

(56) References Cited

U.S. PATENT DOCUMENTS

| | | | |
|---|---|---|---|
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 10,496,359 | B2 * | 12/2019 | Drinkwater ............. H04L 65/60 |
| 10,629,199 | B1 * | 4/2020 | Parthasarathy ....... G10L 19/167 |
| 10,904,665 | B2 * | 1/2021 | Torok ...................... G06F 3/167 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2005/0259694 | A1 | 11/2005 | Garudadri et al. |
| 2007/0142944 | A1 | 6/2007 | Goldberg et al. |
| 2009/0055383 | A1 | 2/2009 | Zalewski |
| 2014/0010515 | A1 | 1/2014 | Lee et al. |
| 2019/0090028 | A1 | 3/2019 | Kirley |

OTHER PUBLICATIONS

AudioTron Reference Manual, Version 3.0, May 2002, 70 pages.
AudioTron Setup Guide, Version 3.0, May 2002, 38 pages
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Nov. 2, 2020, issued in connection with International Application No. PCT/US2020/049939, filed on Sep. 9, 2020, 19 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

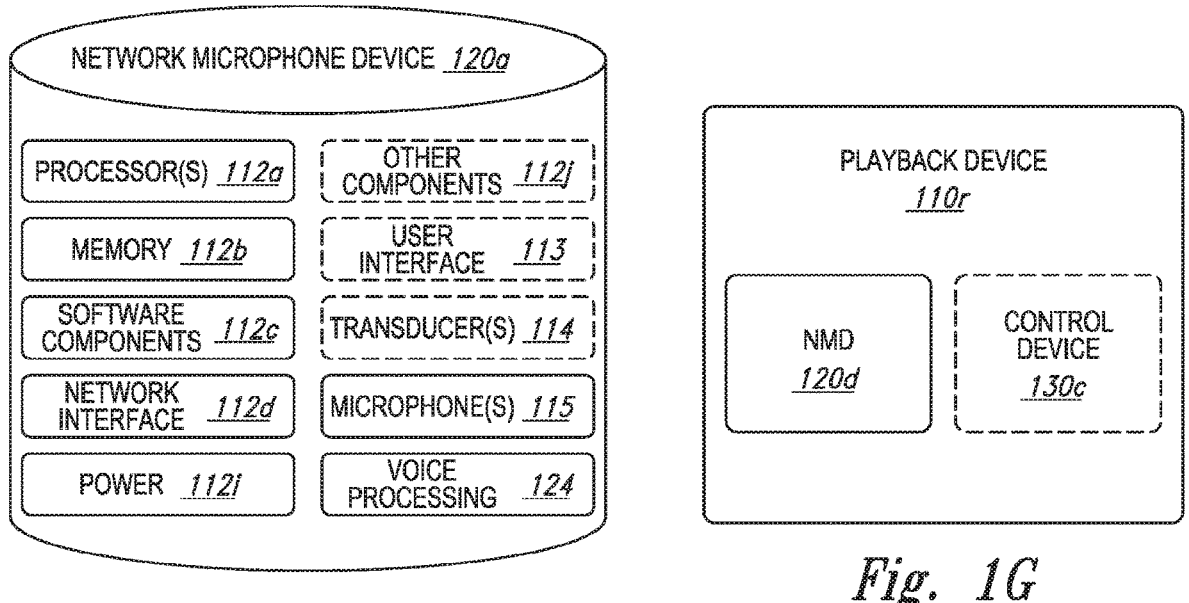
Fig. 1F
Fig. 1G
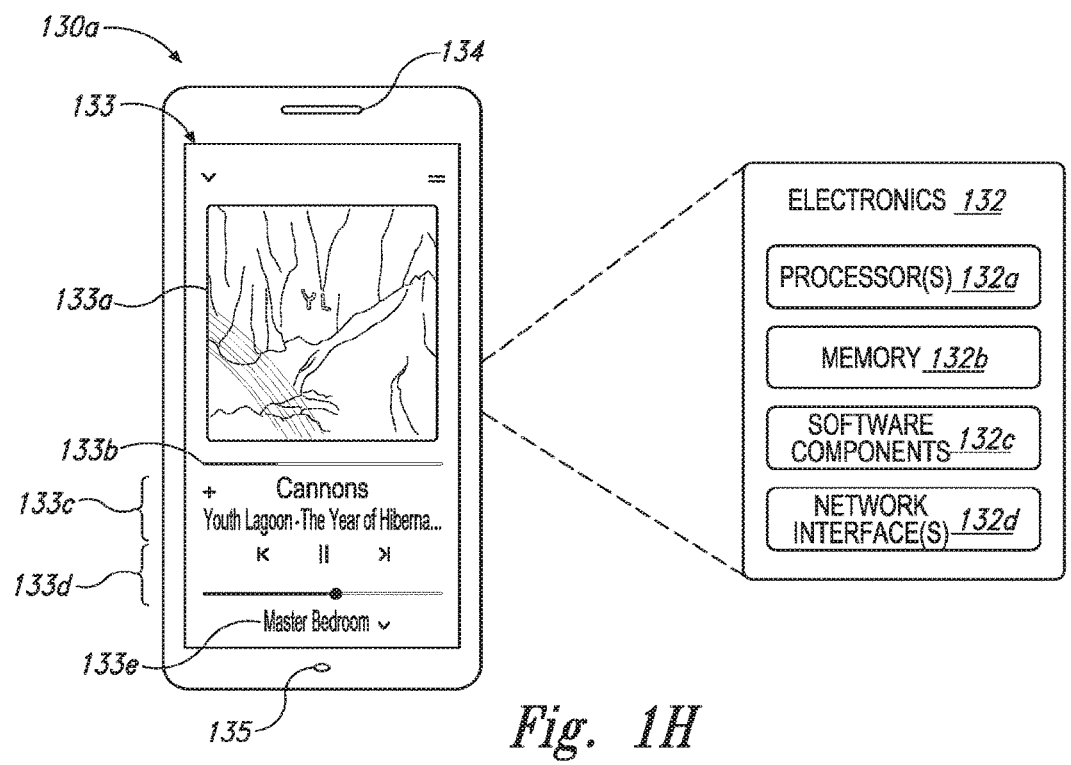
Fig. 1H

SYNCHRONIZING PLAYBACK OF AUDIO INFORMATION RECEIVED FROM OTHER NETWORKS

CROSS REFERENCE TO RELATED APPLICATIONS

The present application is a U.S. National Stage Application of PCT App. PCT/US2020/049939 titled "Synchronizing Playback Of Audio Information Received From Other Networks," filed on Sep. 9, 2020; PCT App. PCT/US2020/049939 claims priority to U.S. Provisional 62/898,194 titled "Synchronizing Playback of Audio Information Received from Unreliable Audio Information Sources," filed on Sep. 10, 2019. The entire contents of PCT/US2020/049939 and 62/898,194 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
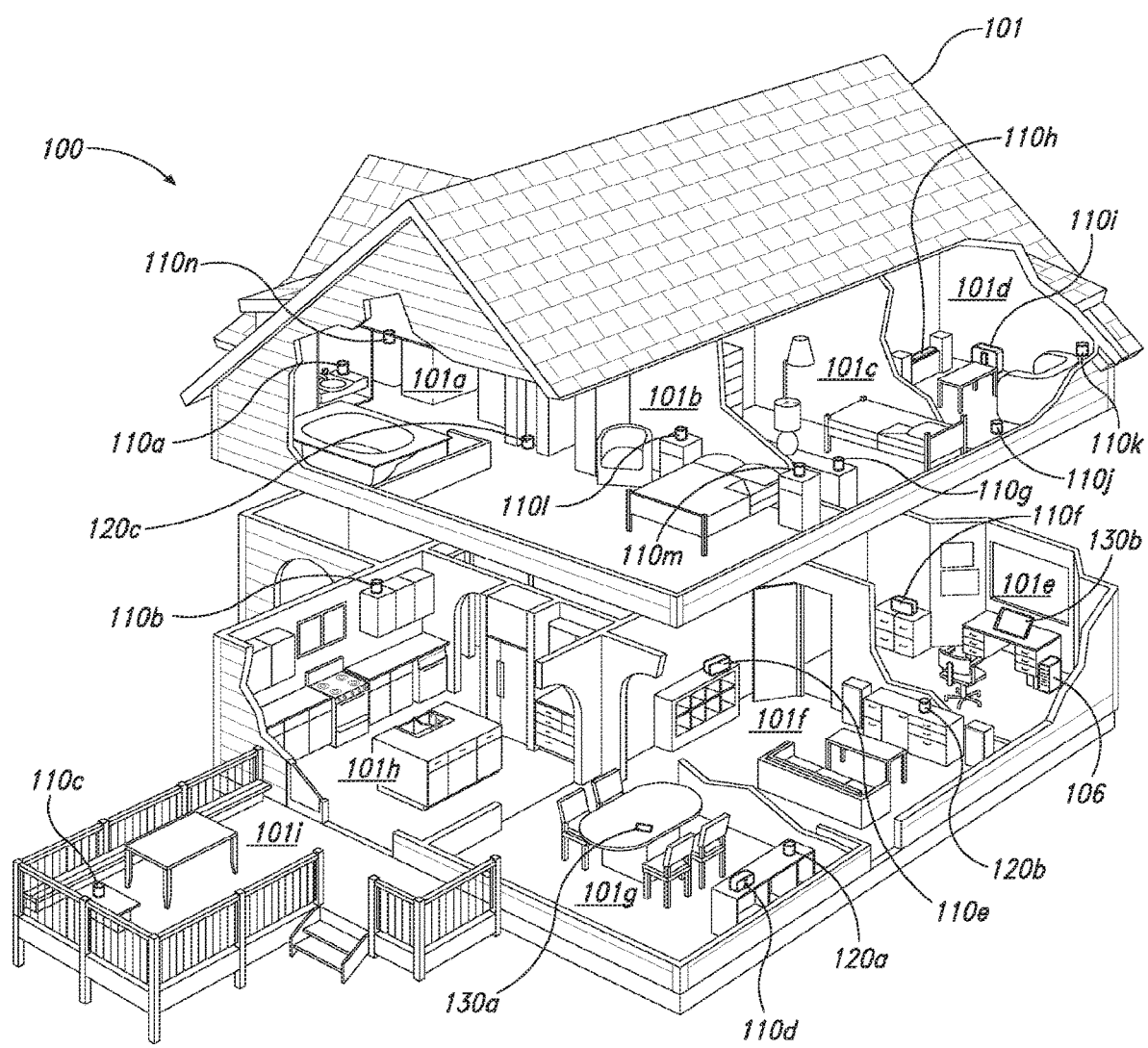
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

It is desirable for media playback systems to play media content (i) from many different sources, e.g., audio streaming services, video streaming services, audio or video sources, voice assistant services (VASs), doorbells, intercoms, telephones, and other media sources, and (ii) via many different types of input interfaces, e.g., WIFI, BLUETOOTH, digital line-in, analog line-in, optical line-in, and other types of input interfaces. But while media playback systems configured to play media content from many different sources via many different types of input interfaces enable users to enjoy music, audio, video, and other media content from nearly any type of media source, coordinating synchronous playback of audio content among multiple playback devices (including audio, video, and audio/video playback devices) in a media playback system from such a diverse set of media sources and interface types in a consistent and reliable way present various technical challenges.

Accordingly, SONOS, Inc. has been continually developing new technology to address such technical challenges and expand the types of input interfaces available for receipt of media content. For example, SONOS, Inc. developed virtual line-in (VLI) to facilitate interoperability between media playback systems. Through VLI, a first media playback system from a first manufacturer may be capable of playing back synchronously with a second media playback system from a second, different manufacturer that would otherwise be incompatible with the first media playback system. Thus, a user can form synchrony groups with arbitrary combinations of playback devices across multiple different media playback systems. Such functionality, among others, is disclosed in U.S. Pat. No. 10,452,345, titled "Media Playback System with Virtual Line-In," issued on Oct. 22, 2019, which is hereby incorporated by reference in its entirety.

Building upon such previous innovations, SONOS Inc. has appreciated that conventional playback devices that support playback of audio received via BLUETOOTH (e.g., BLUETOOTH classic, BLUETOOTH low energy (BLE), etc.), are generally only capable of playing back audio synchronously with other playback devices on the same BLUETOOTH network. Given the range limitations of BLUETOOTH networks, such an architecture is based on an assumption that the playback devices and the audio source are all in close proximity. While such an assumption of device proximity may be true in certain multi-device situations (e.g., synchronous playback of audio by two wireless earbuds worn by a user that each are connected via BLUETOOTH to a smartphone in the user's pocket), the assumption of device proximity does not hold true for other scenarios. For example, this range limitation is problematic for synchronous playback of audio across an entire space (e.g., a house, a business establishment, etc.) at least because the distance between the playback devices and/or the audio source may be considerably larger (e.g., more than 10 meters). Thus, it may be infeasible for all of the grouped playback devices and the audio source to be on a common BLUETOOTH network. As a result, conventional techniques for synchronous playback of audio over BLUETOOTH may not be readily employed for true multi-room synchronous playback.

Accordingly, aspects of the present disclosure relate to new techniques for synchronous playback of audio received over Personal Area Networks (PANs), such as BLUETOOTH networks, that may address one or more of the technical challenges described above. In some instances, the audio that is received by a playback device via a PAN is re-packaged and transmitted to other playback devices over a different network, such as a Wireless Local Area Network (WLAN), for synchronous playback. In such instances, the playback device may support synchronous playback with any other playback device that is connected to the same different network (e.g., the same WLAN). Accordingly, the range limitations of the PAN may be obviated by the playback device bridging the audio from the PAN to another network that may have a considerably larger range than the PAN. As a result, a user can stream audio over a PAN from a computing device to a first playback device (e.g., a playback device proximate the user) and have that audio played back on any arbitrary combination of playback devices on the same WLAN as the first playback device. Further, a user can stream audio over a PAN to a first playback device for playback by one or more second playback devices that may not directly support playback over a PAN (e.g., playback devices that may not have the physical radio hardware to support communication over the PAN). For example, a user can stream audio over a BLUETOOTH connection to a portable playback device that supports BLUETOOTH communication for playback on one or more stationary playback devices that do not support BLUETOOTH communication.

It should be appreciated that supporting synchronous playback of audio received over a PAN may raise additional technical challenges. In some instances, such an architecture may raise technical problems relating to synchronization of metadata associated with the media between devices connected to different networks. For example, a media playback system may have an arbitrary number of control devices that each may show metadata about the media being played back on any set of one or more playback devices in the media playback system. Such control devices are unlikely to have direct access to the PAN over which the media content (and/or any metadata associated with that media content) is being transmitted to a playback device. As a result, such control devices would be blind to the media playback activity on the media playback system.

Accordingly, in some instances, the playback device that is bridging the media content from a PAN to the WLAN to facilitate synchronous playback with other playback devices on the WLAN may also function to bridge metadata associated with the media content from the PAN to the WLAN to facilitate transmission of the metadata associated with the media content to other devices (e.g., control devices, playback devices, etc.) on the WLAN. Thus, any device on the WLAN may output (e.g., via a display) the status of such playback activity (e.g., one or more playback devices are playing back a particular audio track received via a PAN).

Another technical challenge that may arise from supporting synchronous playback of audio received over a PAN includes maintaining a high degree of reliability. For example, media sources can typically provide media content to a media playback system in a consistent fashion via a reliable communication link such as via a wired link (e.g., electrical cable, optical cable, and other wired connections) and/or a robust wireless link, such as a WIFI wireless link. Wireless links over a PAN, however, typically provide media content less consistently and/or reliably than WIFI links at least in part because WIFI links tend to operate a higher transmission power and with better wireless link budgets than BLUETOOTH links. Additionally, WIFI transmission protocols tend to have better error detection and correction and more robust and sophisticated retransmission capabilities than BLUETOOTH transmission protocols.

When the media playback system receives media content from a media source inconsistently and/or unreliably, the media playback system may not be able to reliably coordinate synchronous playback of the received media content in a consistent and reliable manner because frequent packet losses and missing packets of media content can cause the playback devices in the media playback system to malfunction (e.g., play the media content "out-of-sync" with each other, generate error messages, interrupt playback, etc.). When the playback devices are playing audio content out of sync with each other, the user hears echo effects caused by the playback devices playing portions of the audio content at different times. And for audio content having corresponding video content, when the playback devices play the audio content out of sync with a display (e.g., television, video monitor, or other display device), the viewer can see lip sync delay, where the audio sound is out of sync with the corresponding video.

Accordingly, in some instances, the playback device may treat audio received via a PAN (or other unreliable source) differently from audio received via another mechanism (e.g., a wired connection, a WLAN, etc.). In such instances, the playback device that is bridging the media content from the PAN to the other network (e.g., a WLAN) may perform one or more additional operations relative to media content received via other mechanisms to enhance reliability of the media playback system. For example, the playback device receiving the audio over the PAN may intelligently identify missed packets and create null packets for transmission to other playback devices from synchronous playback such that the other playback devices receive a consistent stream of information. Additionally (or alternatively), the playback device receiving the audio over the PAN may employ a resynchronization procedure should a number of packets be dropped in succession over the PAN to avoid creating echoes when the audio restarts. Still yet further, the playback device may monitor the status of the connection to the media source over the PAN and output one or more messages (directly or indirectly) to a user should the connection quality fall below a threshold (e.g., signal strength falls below a threshold, number of packets lost or otherwise dropped exceeds a threshold, etc.) to alert the user. For example, the playback device may send one or more messages to the device functioning as the media source (e.g., over the PAN or over another connection between the playback device and the media source such as a WLAN) that trigger a notification (e.g., a pop-up on a user's smartphone) to inform them of the low-quality of the connection and/or provide one or more suggestions regarding how the user can improve the quality of the connection (e.g., suggest the user move the device functioning as the media source closer to the playback device receiving the audio over the PAN).

The techniques disclosed and described herein overcome these and other technical problems that can arise when supporting synchronous playback of audio content received via another network (e.g., another wireless network), such as a personal area network (PAN). In some embodiments disclosed herein, a first playback device receives a first stream of data comprising a first series of frames comprising encoded audio information. In some embodiments, and as described further herein, the first playback device is, comprises, and/or at least performs one or more functions of a group coordinator for a synchrony group. As described herein, a synchrony group is a group of playback devices configured to play audio in a groupwise fashion in synchrony with each other. A synchrony group may include the first playback device, but it need not include the first playback device. That is, the first playback device may perform the group coordinator function but not play audio in synchrony with the other playback devices in the synchrony group. Also, although many examples disclosed herein describe frames, the systems and methods are equally applicable to (and may be implemented with) packets, cells, or other data structures suitable for transmitting data between a transmitter and receiver.

In operation, an individual frame in the first stream has a first framing format. In some embodiments, one or more frames in the first stream also include a sequence number or other identifier that specifies an ordering of the frames in the first stream. Frames transmitted over a data packet network (e.g., Ethernet, WIFI, or other data networks) may arrive out of order, so in some embodiments, the first playback device uses the sequence number or other identifier to reassemble frames in the first stream in the correct order before performing further processing. In some embodiments, the sequence number or other identifier that specifies the ordering of the frames is (or at least comprises) a timestamp indicating a time when the frame was created. The frame creation time can be used as a sequence number based on an assumption that frames are created in the order in which they should be subsequently processed and/or played out. And as described further herein, in some protocols, frames or packets include both a sequence identifier and a timestamp, where the sequence identifier can be used to reorder frames/packets and/or identify missing frames/packets, and where the timestamp (individually or in combination with timestamps of adjacent frames/packets) can be used to determine a duration time required for playback of audio information within the frame/packet.

After the first playback device (which may be the group coordinator for a synchrony group) receives an individual frame in the first stream (the incoming stream), the first playback device extracts the encoded audio information from that individual incoming frame. And while the first playback device continues to receive the first stream (the incoming stream), the first playback device generates and transmits a second stream (i.e., the outgoing stream, sometimes referred to as the second series of frames) comprising the extracted audio information to at least a second playback device (and perhaps also to additional playback devices). In operation, individual frames in the second stream (the outgoing stream) have a second framing format that is different than the first framing format for the frames in the first stream (the incoming stream).

The frames in the second stream comprise (i) portions of the encoded audio information extracted from individual frames of the first stream and (ii) playback timing information that includes playback timing for the portions of the encoded audio information extracted from the first stream. As described herein, in some embodiments, this playback timing information is new timing information (e.g., a new timestamp) that the first playback device (or group coordinator) generates and transmits to at least the second playback device for the purpose of coordinating synchronous playback of audio content by the first playback device and at least the second playback device. In operation, the first playback device uses the portions of the encoded audio information extracted from the first stream and the playback timing to play the audio content (based on the encoded audio information) in synchrony with at least the second playback device.

In operation, the first playback device (i) generates an individual frame of the second stream (the outgoing stream) comprising one or more portions of encoded audio information that the first playback device extracted from an individual frame of the first stream (the incoming stream) that the first playback device received only a few milliseconds earlier, and (ii) plays that portion of the encoded audio information in synchrony with at least the second playback device only a few milliseconds after transmitting the individual frame of the second stream comprising that portion of the encoded audio information to at least the second playback device. For example, in some embodiments, for an individual portion of encoded audio information, and within only a few milliseconds (e.g., between about 20-300 milliseconds, the first playback device (i) receives a frame (of the first stream) comprising the portion of audio information, (ii) extracts that portion of audio information from that frame (of the first stream), (iii) generates and transmits a frame (of the second stream) to at least the second playback device, and (iv) plays audio content (based on that portion of audio information) in synchrony with at least the second playback device (and perhaps additional playback devices).

The above-described ability to receive a first stream of frames (or packets or cells) having a first framing format (or packet format or cell format) and generate a second stream of frames (or packets or cells) having a second framing format (or packet format or cell format) enables the first playback device to receive audio information and play audio content (based on the audio information) from a wide variety of audio sources, thereby achieving one aspect of the disclosed systems and methods by enabling the first playback device to use a common format (e.g., the second framing format) for streaming audio information and playback timing information to at least the second playback device (and perhaps also to additional playback devices) regardless of (i) the format of the first stream, and/or (ii) the sequence identifier, timestamp, or other timing and/or sequence information in the first stream.

Because the first playback device generates and transmits the second stream while receiving the first stream, and because the time between when the first playback device receives a portion of audio information via the first stream and transmits that same portion of audio information via the second stream is quite short (e.g., typically only about 20-300 milliseconds), any inconsistencies in the first stream (e.g., delays, lost frames) and/or errors in audio information received via the first stream introduces technical challenges that inhibits the first playback device's ability to consistently and reliably generate and transmit the second series of frames to at least the second playback device.

In particular, the first playback device cannot transmit portions of audio information to the second playback device that the first playback device either does not receive and/or does not receive in sufficient time to process and stream to the second playback device for synchronous playback.

So, to prevent inconsistencies, delays, and errors that may exist in the first stream from causing similar inconsistencies in the second stream, the first playback device in some embodiments, additionally (i) determines whether the first stream is missing one or more portions of the encoded audio information, and (ii) in response to determining that the first stream is missing one or more portions of the encoded audio information, generates one or more null portions corresponding to the one or more missing portions of the encoded audio information. Missing one or more portions of the encoded audio information includes missing a packet comprising a portion of the audio information because either (i) a packet/frame comprising the audio information was not received or (ii) the packet/frame comprising the audio information was received, but the audio information in that packet/frame was corrupted and could not be used (e.g., an error check performed by the receiver determined the audio information had errors).

And when the first playback device generates the second stream, the first playback device inserts the one or more null portions into the second stream at the places where the missing portions of audio information would have been. And when the first playback device generates the playback timing for the audio information for the second stream, the first playback device assigns playback times for the one or more corresponding null portions in the second stream. Further, when using the audio information and the playback timing of the second stream to play audio content (based on the audio information in the second stream) with at least the second playback device, the first playback device uses (i) the portions of audio information extracted from the first stream, (ii) the playback timing for the portions of audio information extracted from the first stream, (iii) the null portions corresponding to the missing portions of audio information that were missing from the first stream, and (iv) the playback timing for the null portions inserted into the second stream. In operation, this approach enables both (i) the first playback device to generate and transmit a consistent second stream to at least the second playback device (and perhaps additional playback devices), and (ii) at least the second playback device (and perhaps additional playback devices) to receive a consistent stream (i.e., the second stream) from the first playback device.

In some embodiments, the first playback device additionally or alternatively monitors the incoming stream to detect problems with the incoming stream such as (i) dropped packets (e.g., there is a gap in the sequence numbers of the packets in the incoming stream), or perhaps more than a threshold amount or number of dropped packets, and/or (ii) more than some threshold quantity of packets that arrive too late to be processed and distributed to the second playback device (and perhaps additional playback devices) in time for the second playback device (and perhaps additional playback devices) to play the audio content in those packets in synchrony with the other playback devices in the synchrony group (e.g., the determined playback time for audio in the packet is too close to the present time or is perhaps in the past).

In response to detecting one or more of the above-described problems with the incoming stream, the first playback device (i) sends one or more commands to the other playback devices in the synchrony group, which causes those other playback devices to "flush" (i.e., delete) at least some (and perhaps all) of their current buffer of audio packets (comprising audio content) queued for playback, and (ii) resets an "origin time" (i.e., a reference start time) from which to restart generating playback timing for the audio content received via the incoming stream. As mentioned above and described further herein, the playback devices in a synchrony group use the playback timing generated by this first playback device (sometimes referred to as the group coordinator for the synchrony group) to play the audio content in synchrony with each other. In this manner, by flushing the playback device buffers of queued audio packets for playback, the first playback device in effect resynchronizes audio playback by the synchrony group. In operation, resynchronizing audio playback by the synchrony group in this way is similar to how the first playback device initially synchronizes audio playback by the synchrony group. By resynchronizing playback of the audio content by the synchrony group in the manner described herein, some embodiments are able to identify problems in the incoming stream (received from an unreliable source) before missing and/or late-arriving packets cause problems and/or delays that propagate through the synchrony group and disrupt playback.

These and other aspects of the technical solutions disclosed herein enable a first playback device to (i) receive a first stream of frames (having a first format) comprising encoded audio information and other control/timing information, (ii) generate and transmit a second stream (having a second format) comprising the encoded audio information and playback timing information to one or more additional playback devices (i.e., at least the second playback device and perhaps additional playback devices), and (iii) play audio content based on the encoded audio information in synchrony with the one or more additional playback devices, even when the first stream is unreliable or inconsistent.

For example, some embodiments disclosed herein relate to a first playback device comprising one or more processors and tangible, non-transitory, computer-readable media comprising instructions that, when executed, cause the first playback device to perform computing functions relating to playing audio content in synchrony with one or more other playback devices.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
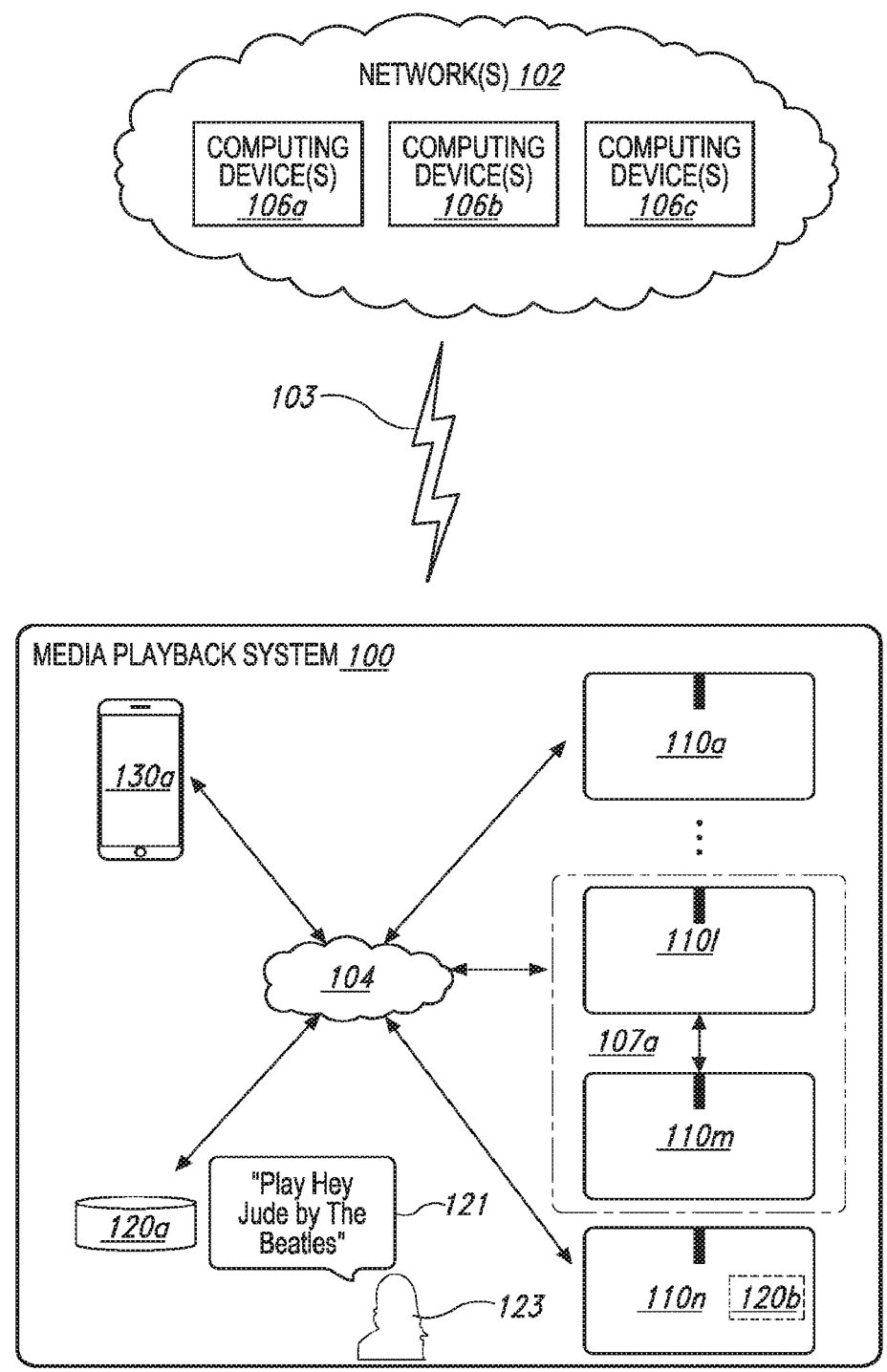
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WIFI network, a BLUETOOTH, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WIFI network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
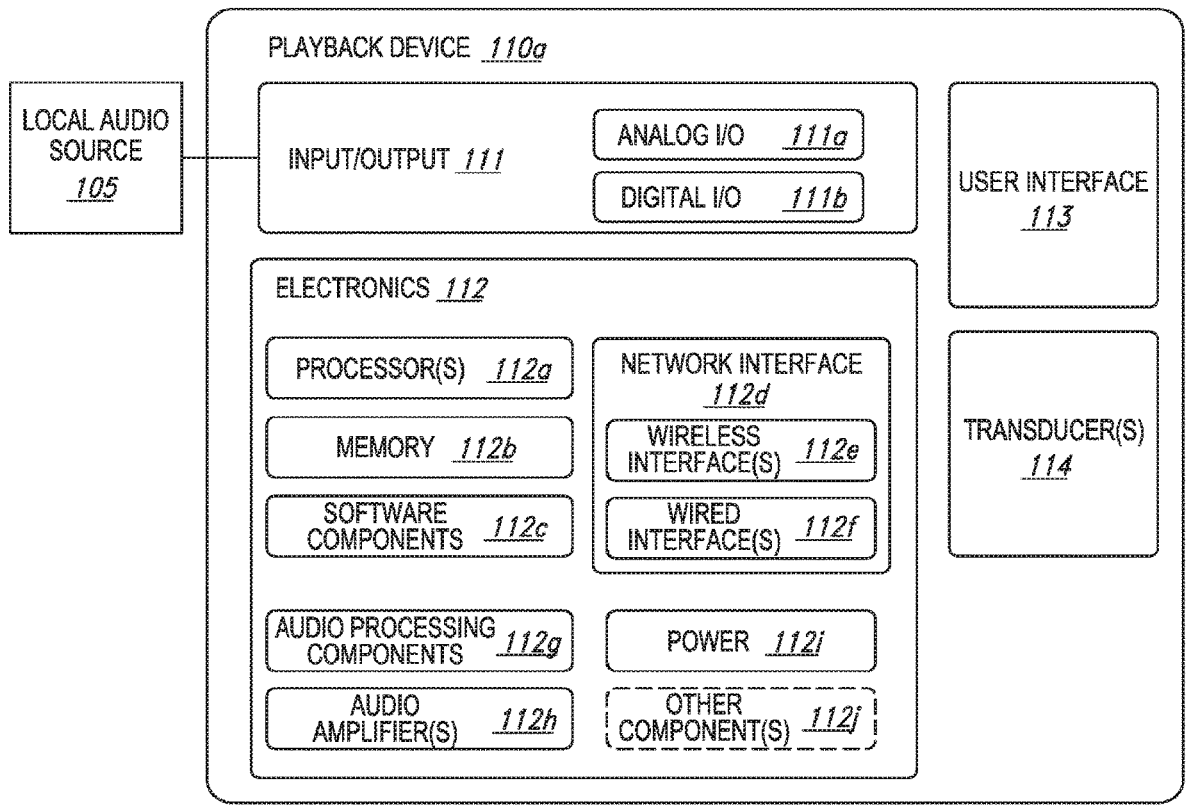
FIG. 1C shows a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WIFI, BLUETOOTH, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112a are configured to execute the instructions stored on the memory 112b to perform one or more of the operations. The operations can include, for example, causing the playback device 110a to retrieve audio information from an audio source (e.g., one or more of the computing devices 106a-c (FIG. 1B)), and/or another one of the playback devices 110. In some embodiments, the operations further include causing the playback device 110a to send audio information to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WIFI, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
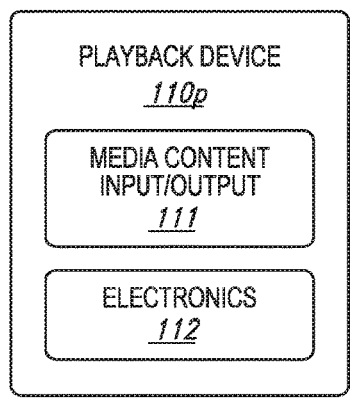
FIG. 1D shows a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT: AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
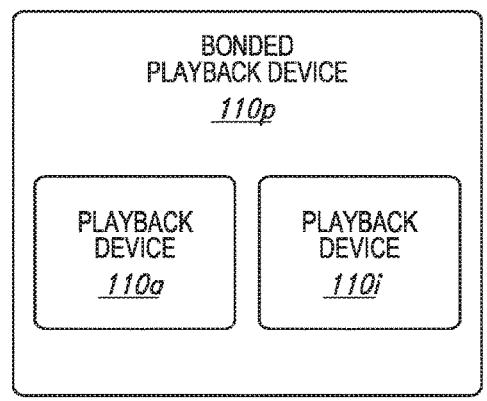
FIG. 1E shows a block diagram of a network microphone device.
Figure 1I:
FIG. 1F shows a block diagram of a network microphone device.
FIG. 1G shows a block diagram of a playback device.
FIG. 1H shows a partially schematic diagram of a control device.
FIGS. 1-I through 1L show schematic diagrams of corresponding media playback system zones.
FIG. 1M shows a schematic diagram of media playback system areas.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™ an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1J:
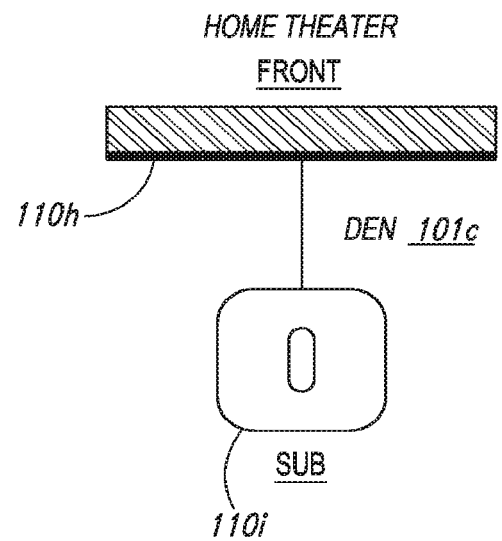
Figure 1K:
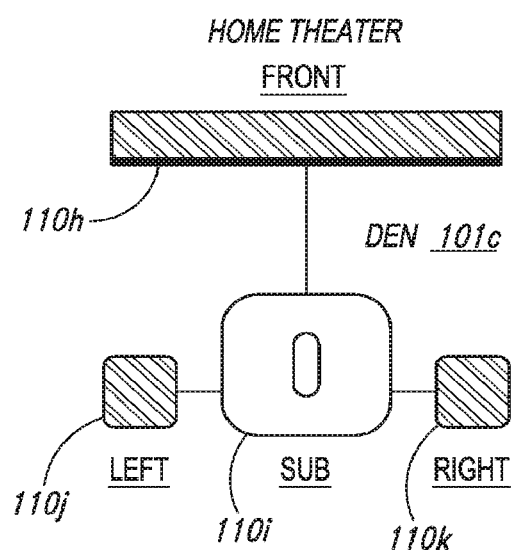
Figure 1L:
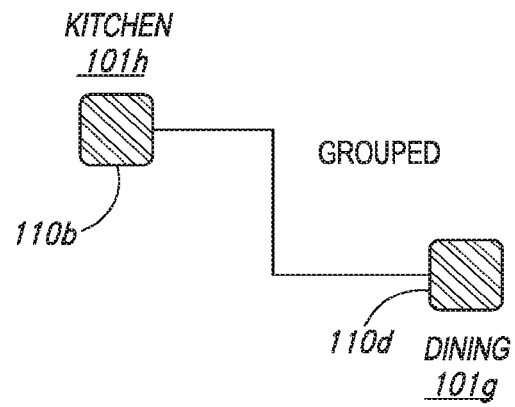
Figure 1M:
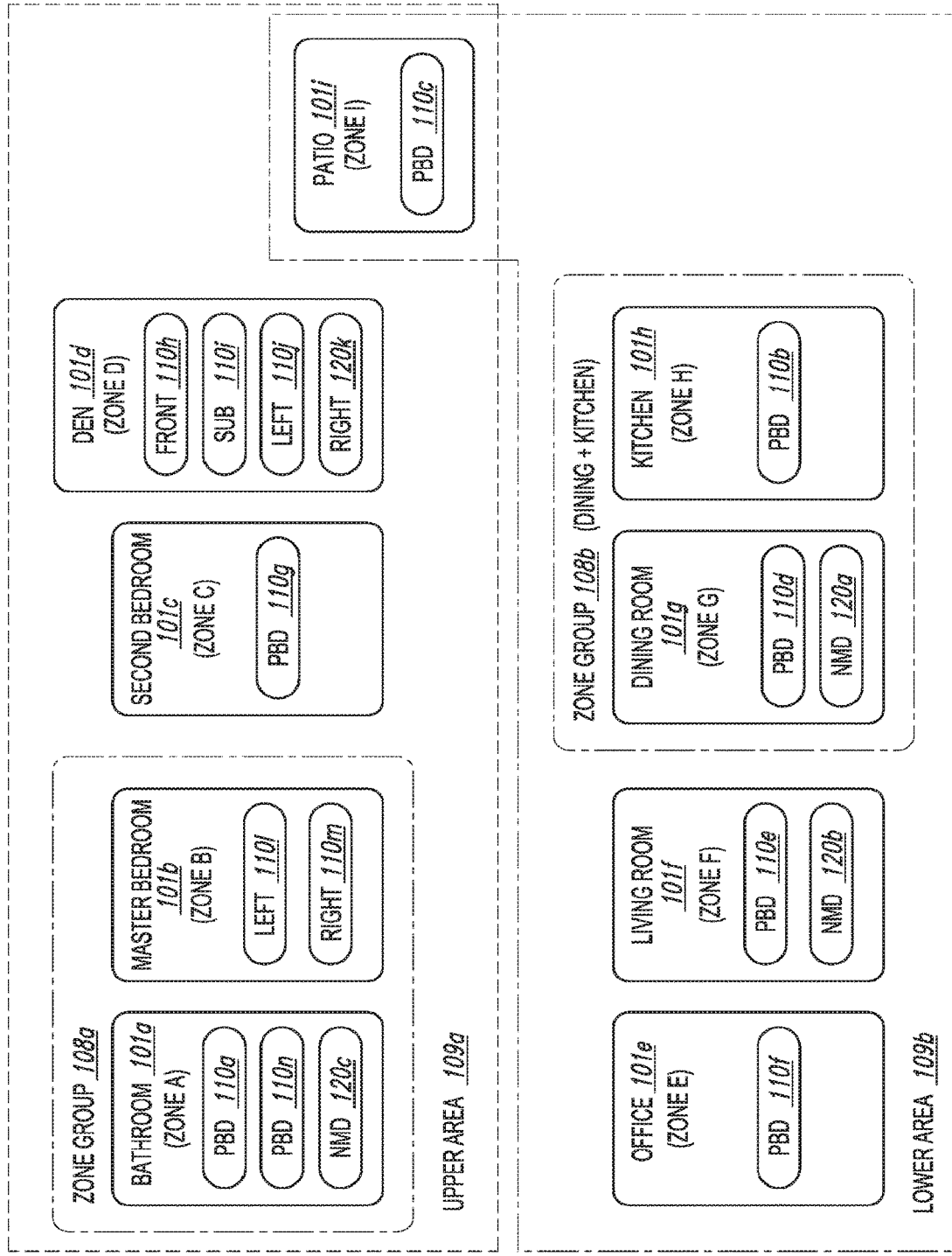

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-

110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
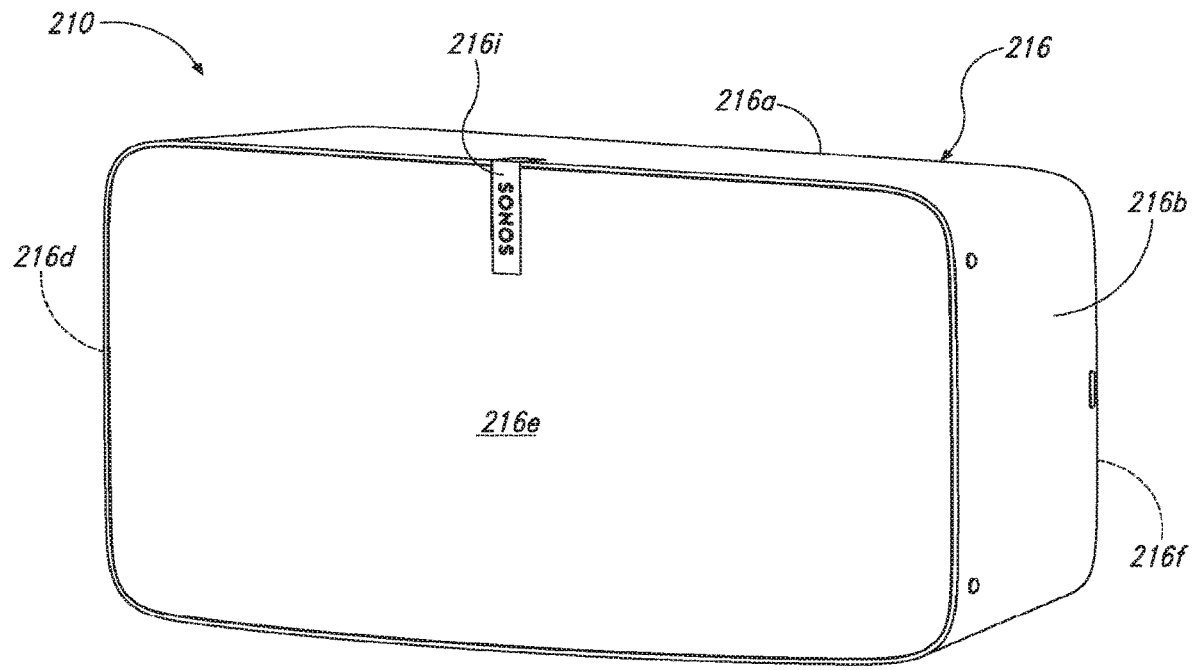
FIG. 2A shows a front isometric view of a playback device configured in accordance with aspects of the disclosed technology.
Figure 2B:
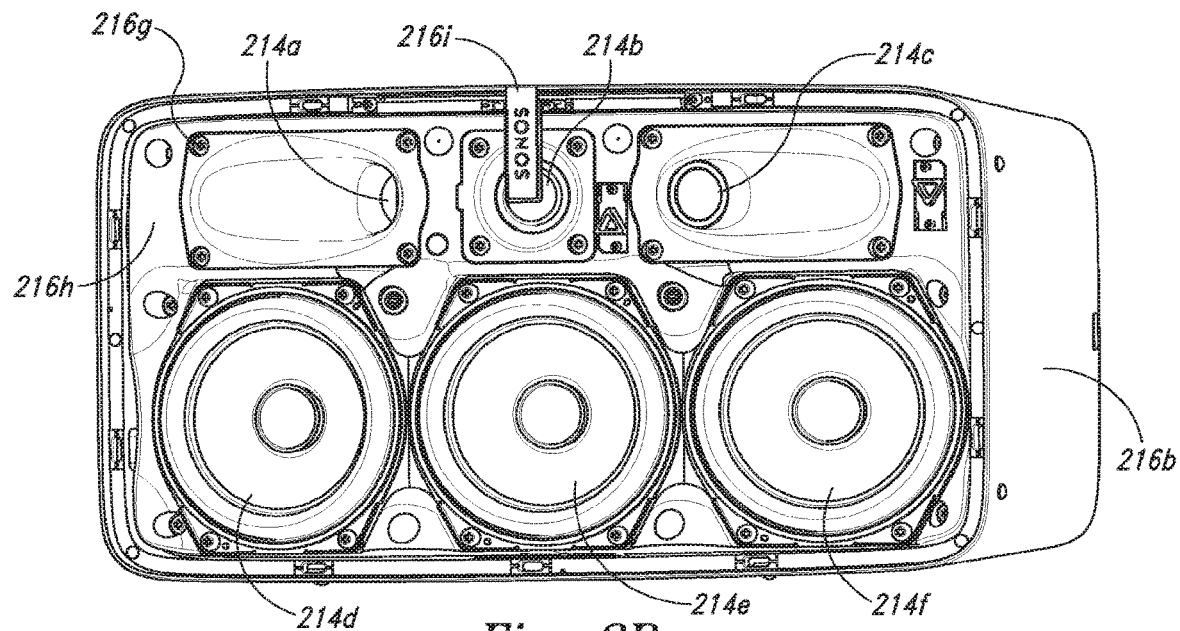
FIG. 2B shows a front isometric view of the playback device of FIG. 3A without a grille.
Figure 2C:
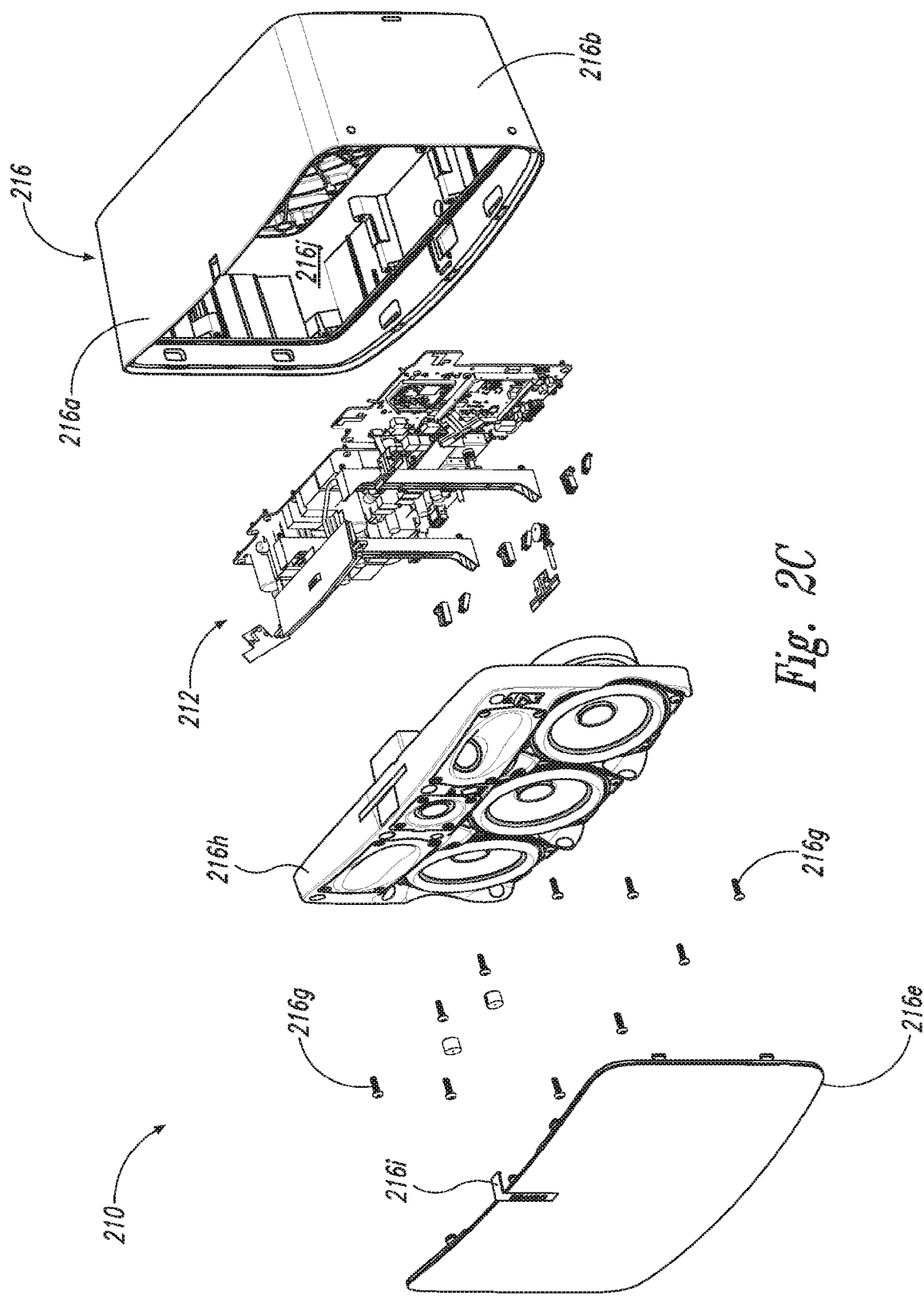
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
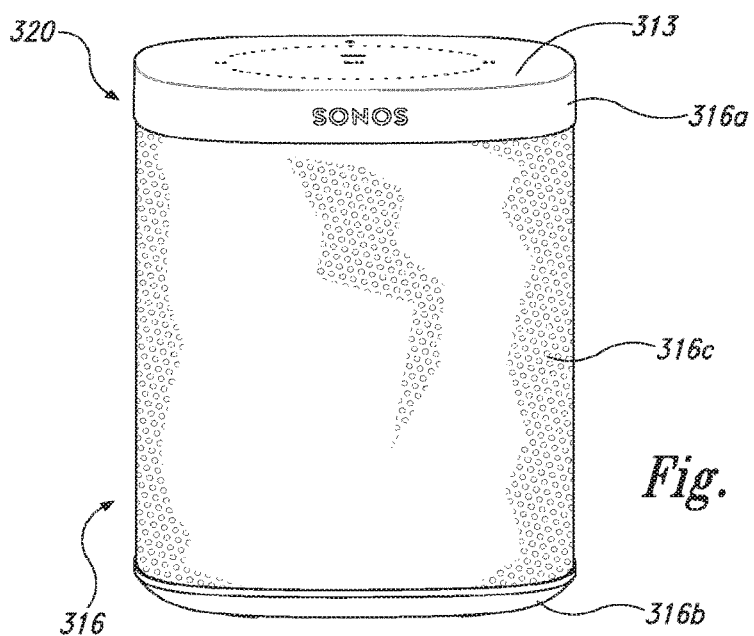
FIG. 3A shows a front view of a network microphone device configured in accordance with aspects of the disclosed technology.
Figure 3B:
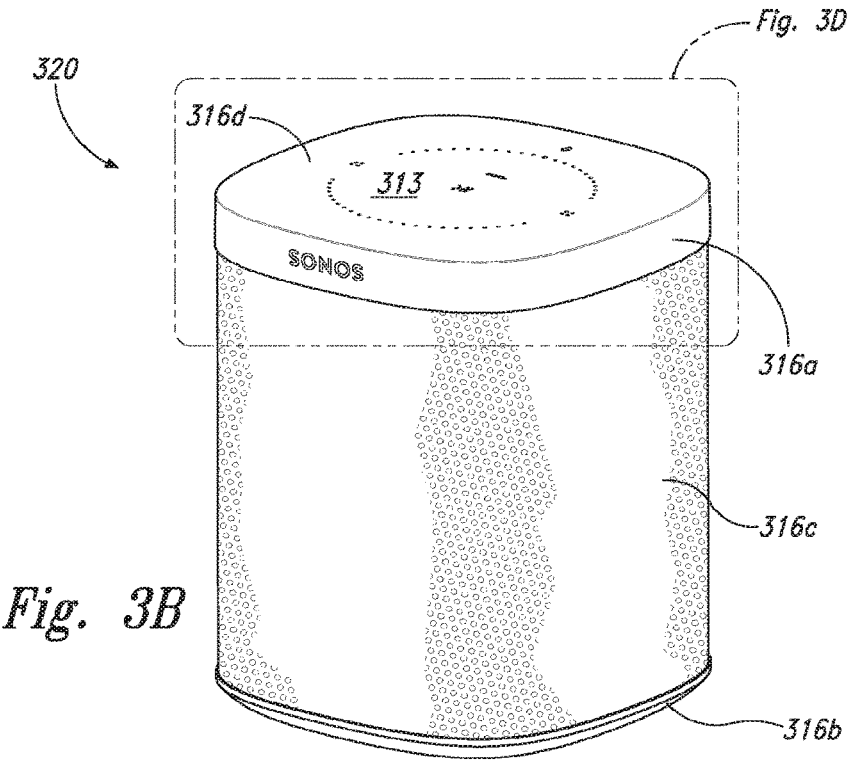
FIG. 3B shows a side isometric view of the network microphone device of FIG. 3A.
Figure 3C:
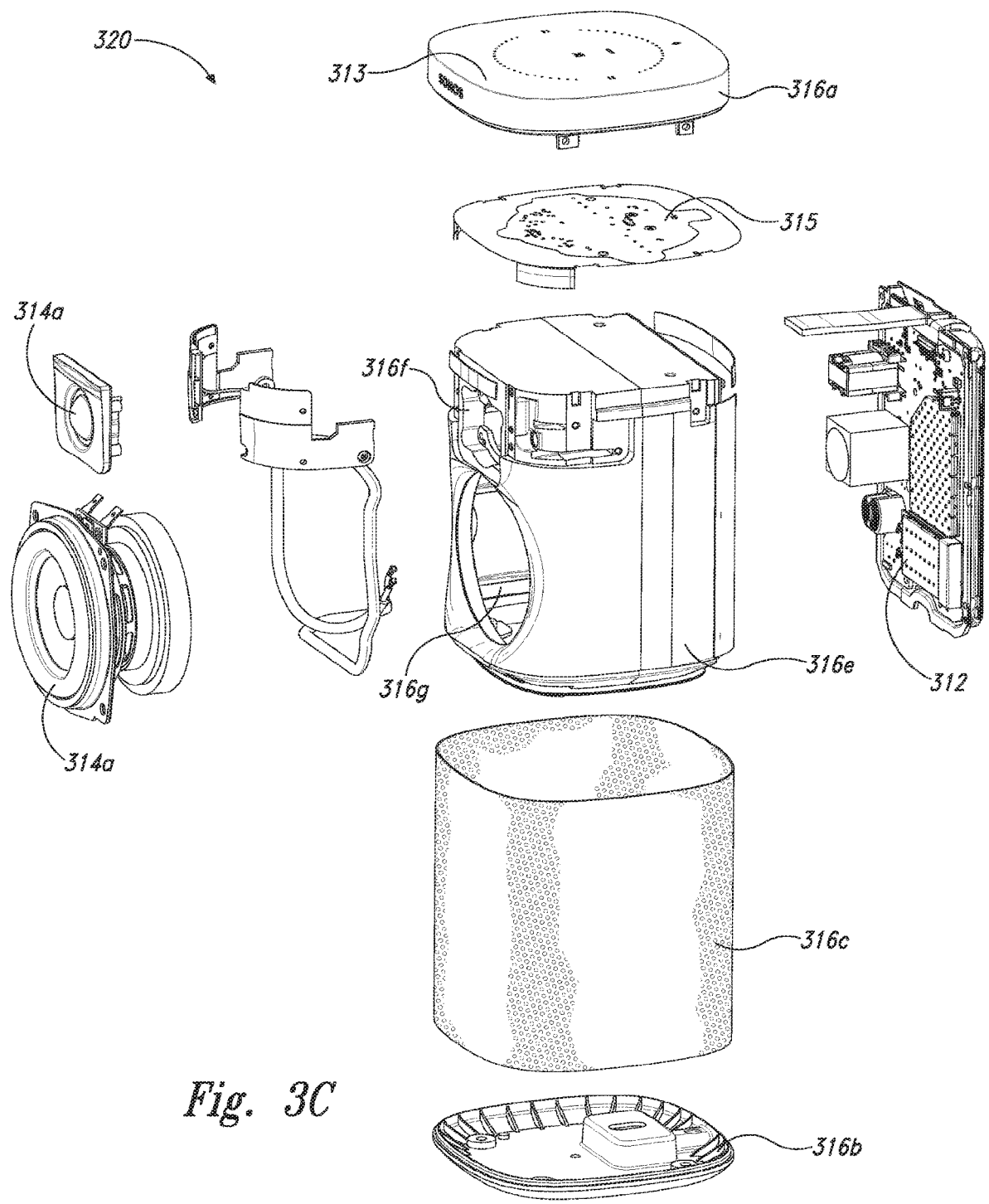
FIG. 3C shows an exploded view of the network microphone device of FIGS. 3A and 3B.
Figure 3D:
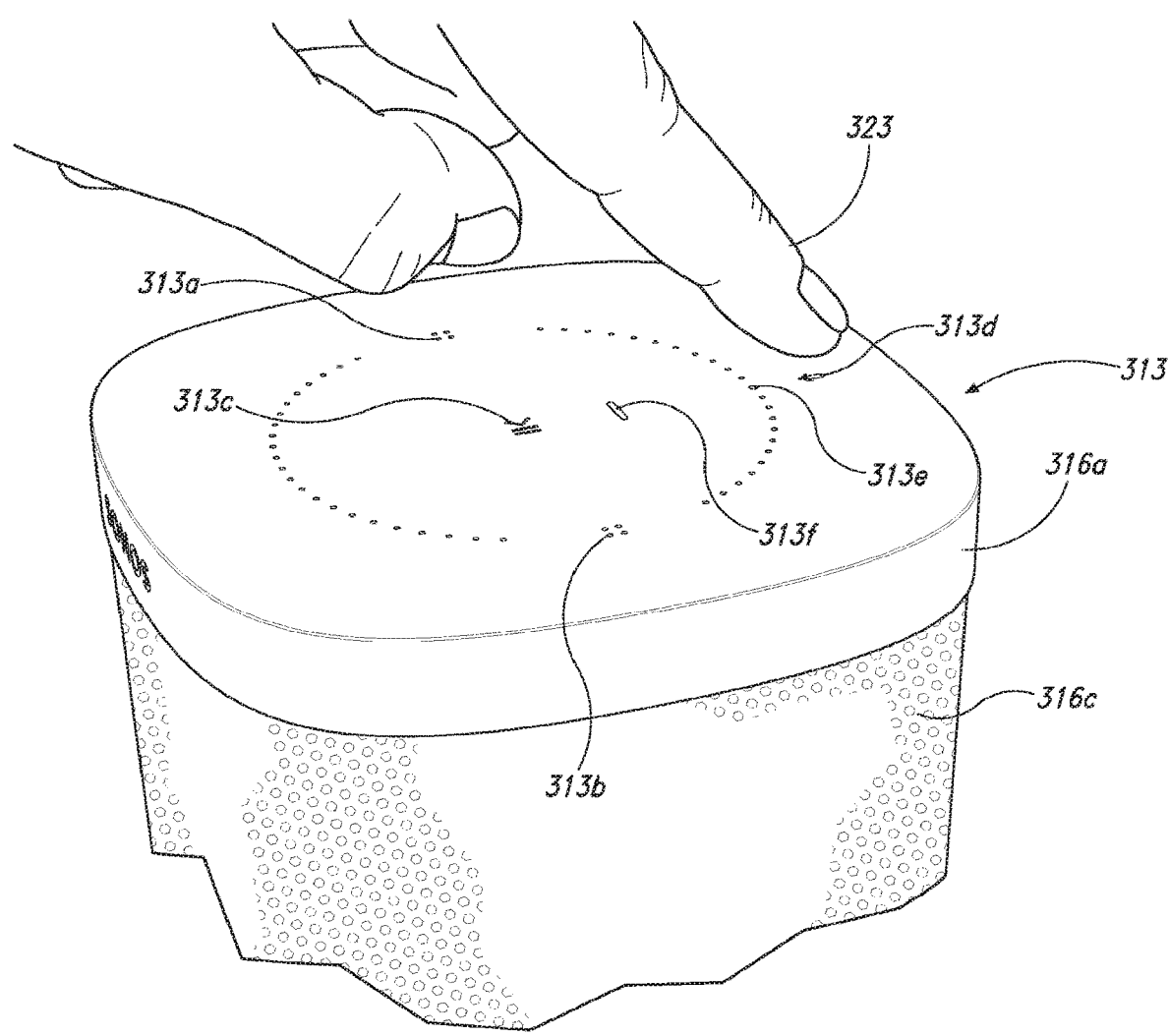
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
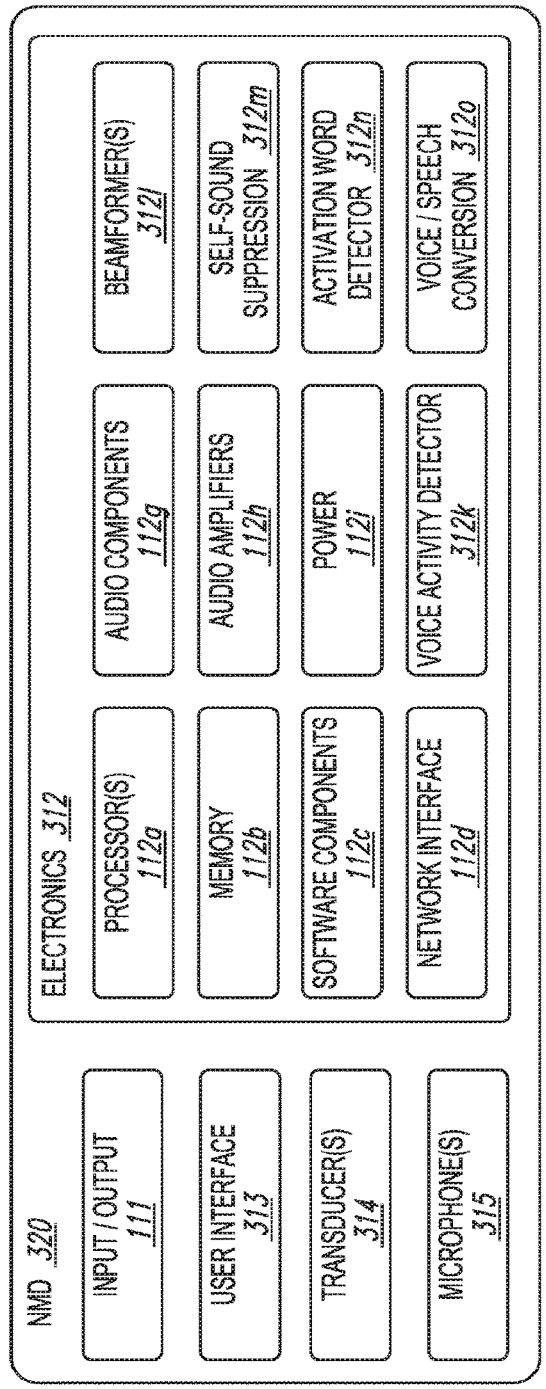
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
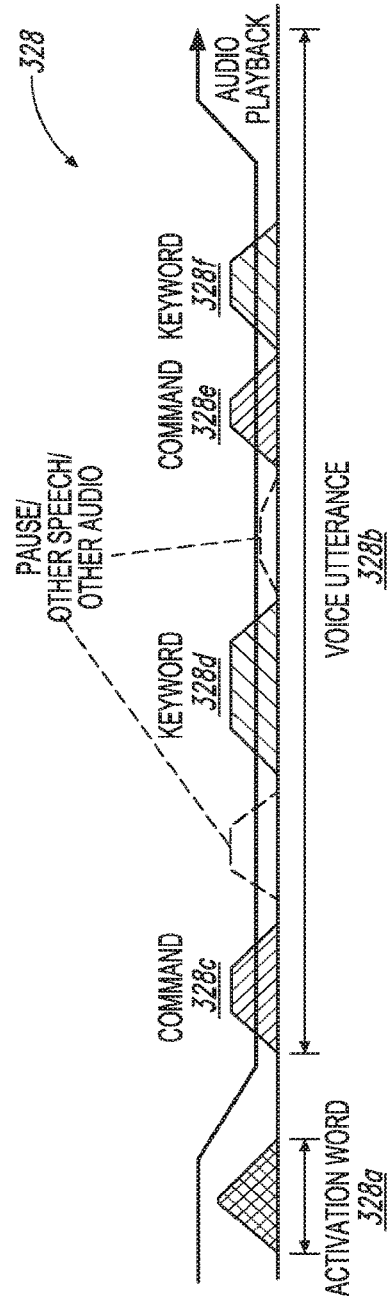
FIG. 3F shows a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
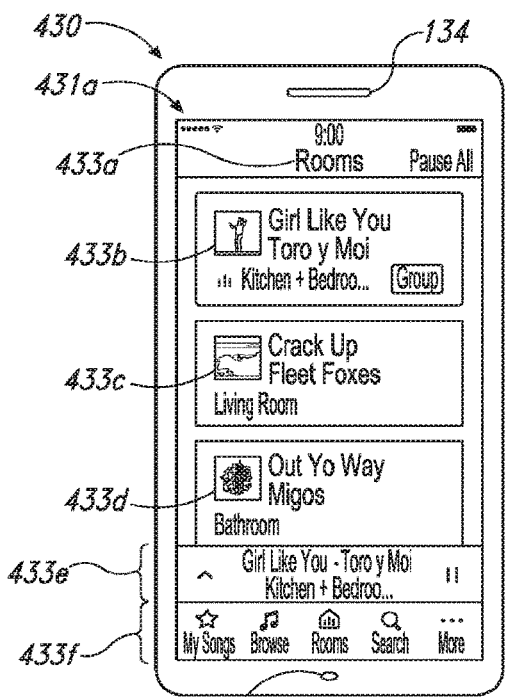
FIGS. 4A-4D show schematic diagrams of a control device in various stages of operation in accordance with aspects of the disclosed technology.
Figure 4B:
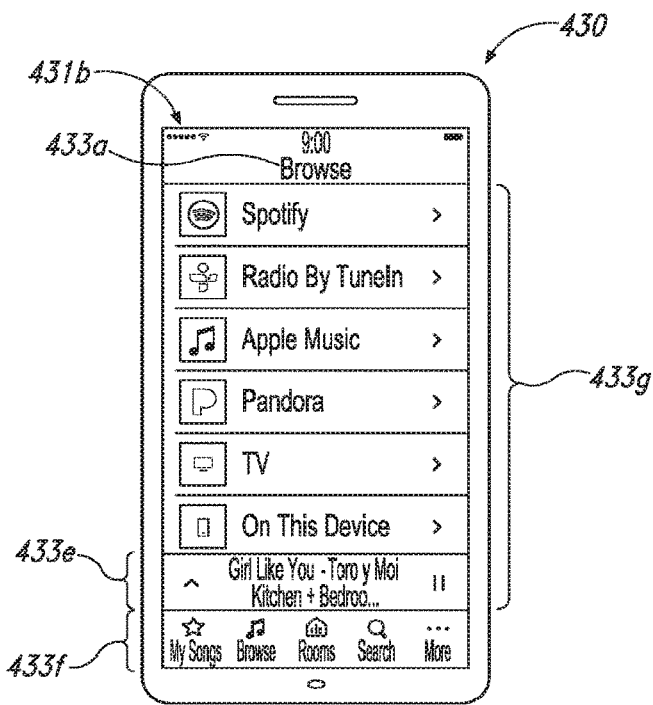
Figure 4C:
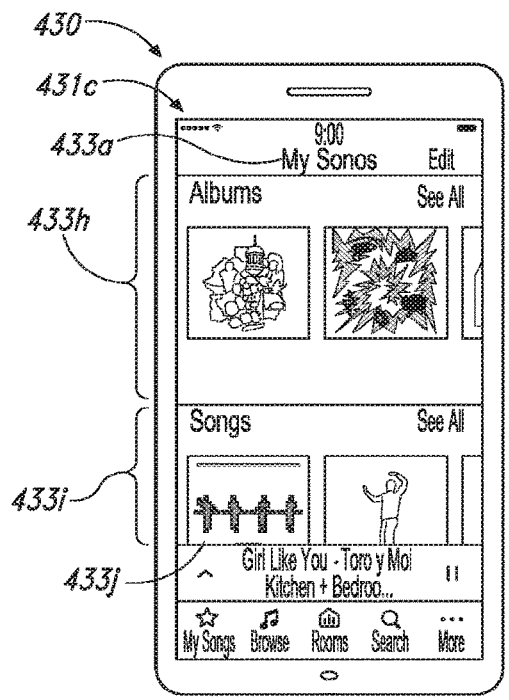
Figure 4D:
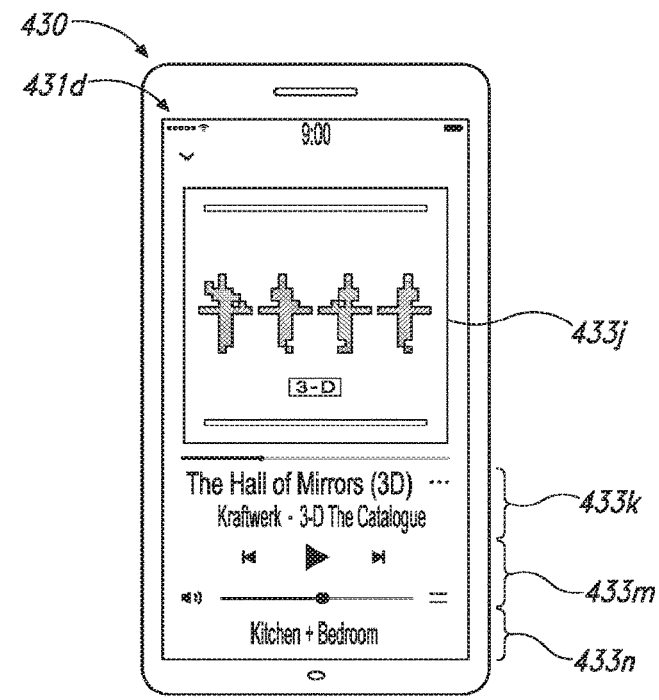

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
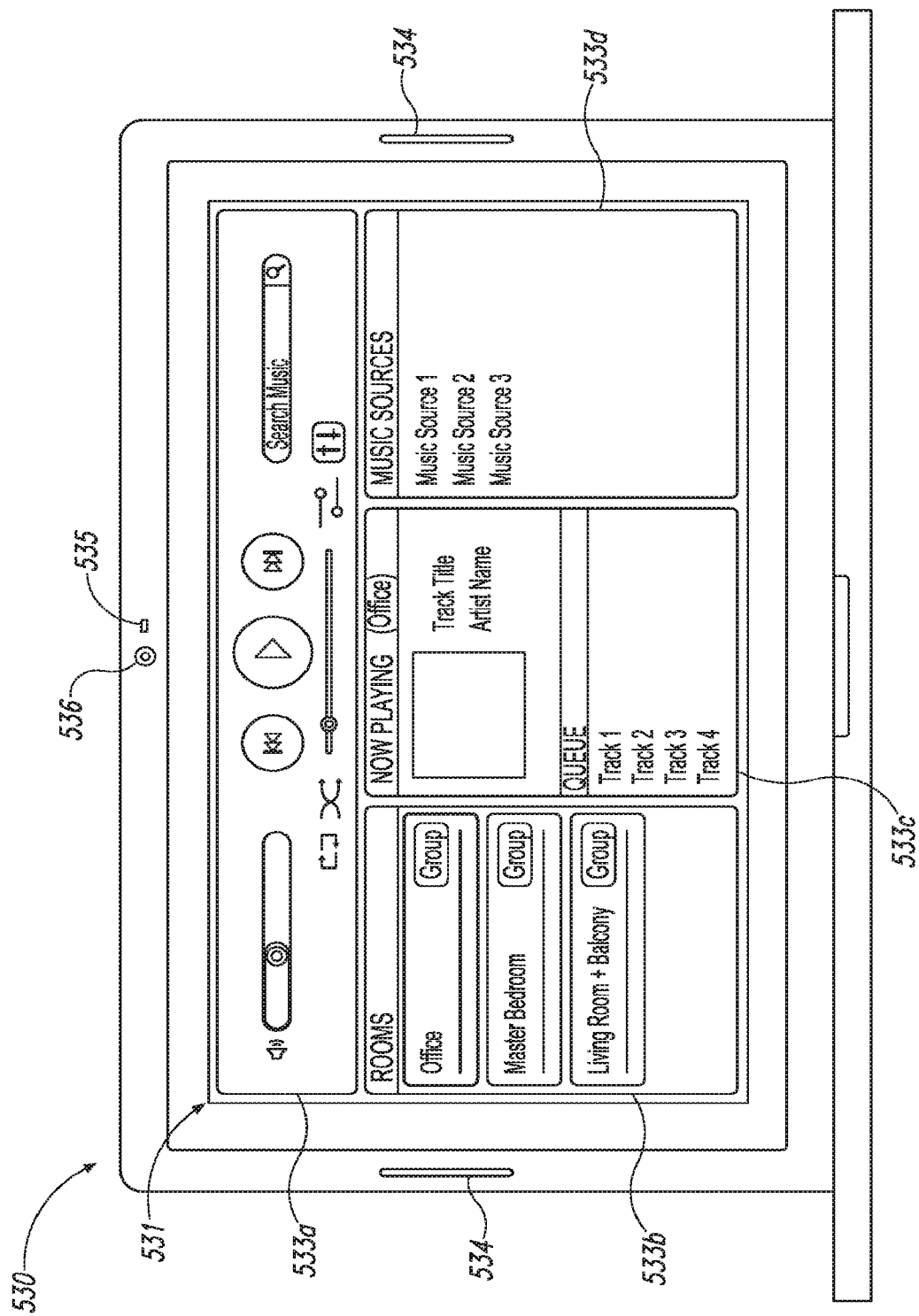
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
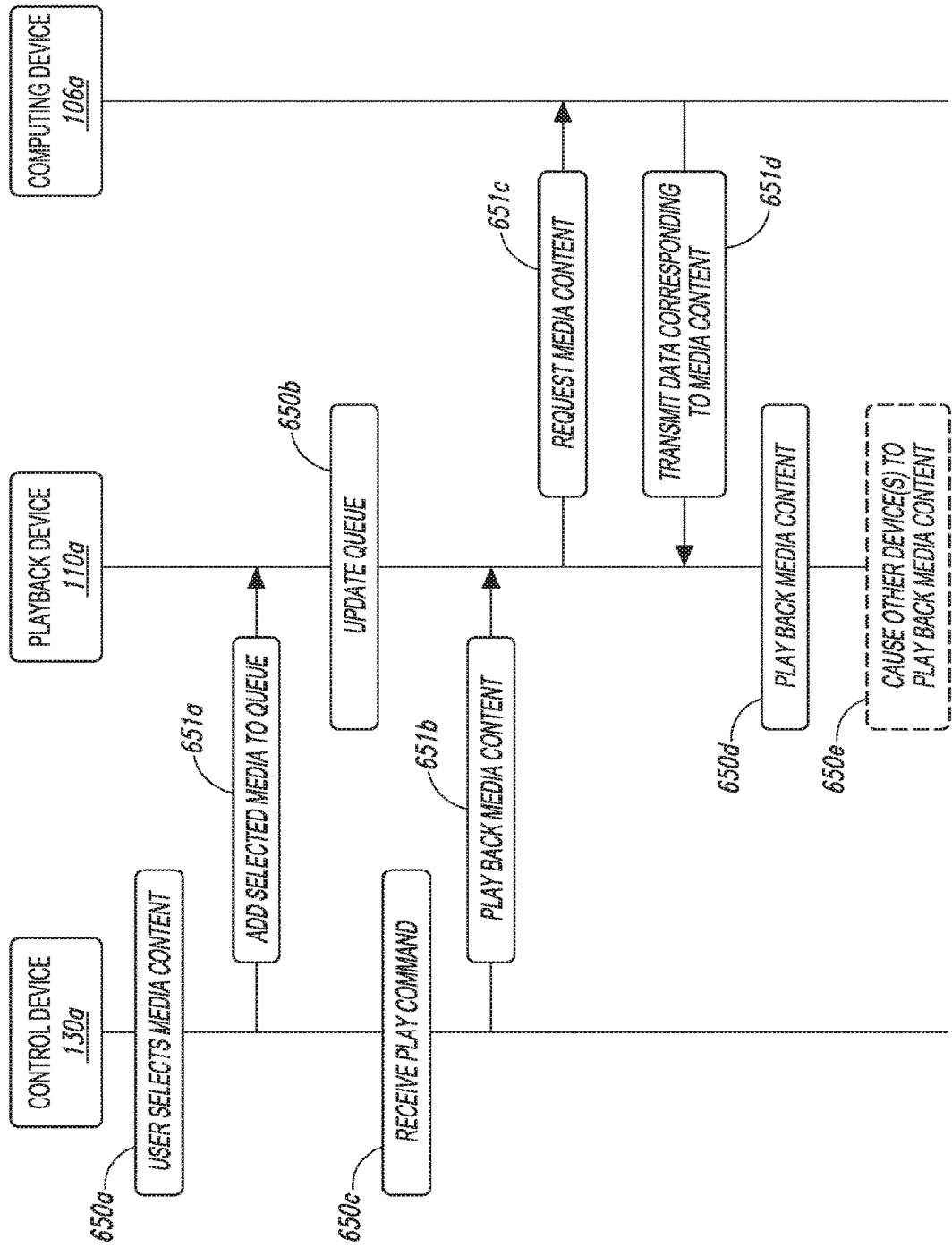
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Overview of Example Embodiments

As mentioned above, it is desirable for media playback systems to play media content (i) from many different sources, e.g., audio streaming services, video streaming services, audio or video sources, voice assistant services (VASs), doorbells, intercoms, telephones, and other media sources, and (ii) via many different types of input interfaces, e.g., WIFI, BLUETOOTH, digital line-in, analog line-in, optical line-in, virtual line-in, and other types of input interfaces. But while media playback systems configured to play media content from many different sources via many different types of input interfaces enable users to enjoy music, audio, video, and other media content from nearly any type of media source, coordinating synchronous playback of audio content among multiple playback devices (including audio, video, and audio/video playback devices) in a media playback system from such a diverse set of media sources and interface types in a consistent and reliable way presents technical challenges because the consistency and reliability of media content delivery varies among different media sources and input interface types.

In some example embodiments, a first playback device (i) receives a first stream of frames comprising encoded audio information from an audio source (described below) via a BLUETOOTH connection, (ii) extracts the encoded audio information from the received BLUETOOTH frames, (iii) generates and transmits a second stream of frames comprising the extracted audio information and playback timing information for the extracted encoded audio information to one or more additional playback devices via a WIFI connection, and (iv) decodes the audio information and plays audio content in synchrony with the one or more additional playback devices by using the encoded audio information and playback timing in the second stream. This example embodiment is sometimes referred to herein as a BLUETOOTH line-in configuration.

For BLUETOOTH line-in configurations, BLUETOOTH frames are often transmitted in a similar fashion to User Datagram Protocol (UDP) packets in that the BLUETOOTH transmitter transmits each frame to the BLUETOOTH receiver once, and it is up to the BLUETOOTH receiver to detect the frames and extract the data therefrom. Also, there is typically no opportunity for the BLUETOOTH receiver to ask the BLUETOOTH transmitter to retransmit a BLU- ETOOTH frame if the BLUETOOTH receiver fails to receive a frame or determines that the data within a frame is corrupted. The 2.4 GHz band in which BLUETOOTH transmitters and receivers operate is extremely congested with many devices, and as a result, wireless interference and BLUETOOTH frame losses are common. For example, other devices that also operate in and around the 2.4 GHz band include (i) cordless telephones, microwave ovens, baby monitors, and garage door controllers in a home, (ii) wireless devices configured to use 2.4 GHZ WIFI networks, (iii) wireless devices configured to use LTE wireless networks, and (iv) other BLUETOOTH devices.

In operation, frequent BLUETOOTH frame losses and transmission errors (e.g., caused by 2.4 GHz network congestion or other forms of interference) can make the BLUETOOTH link between the BLUETOOTH audio information source and the first playback device inconsistent and unreliable. And when the first playback device (e.g., acting as synchrony group coordinator) is distributing the audio information received via the BLUETOOTH link to one or more additional playback devices (e.g., the group members) for synchronous playback (where the group coordinator and the group members form a synchrony group), the first playback device (the group coordinator) and the one or more additional playback devices (the group members) may malfunction (e.g., get out-of-sync with each other and one another) because of delays between transmission of frames of the second stream by the group coordinator, and thus, delays in receipt of frames of the second stream by the group members. As a result, there may be playback anomalies (e.g., echoes) during playback as the group members recover from the malfunction (e.g., resynchronize their playback of audio content with the group coordinator) after the group members experience delays in receipt of frames of the second stream comprising audio information and playback timing from the group coordinator.

As described further below, to avoid or at least ameliorate problems with synchronous playback of audio content by a synchrony group resulting from the group coordinator's unreliable and inconsistent receipt of audio information via an audio source (e.g., audio information received from an audio source via a BLUETOOTH line-in interface), some embodiments disclosed and described herein include the group coordinator, inter alia, (i) generating null data for missing or corrupted audio information, (ii) generating playback timing information for the generated null data, (iii) transmitting the null data and the playback timing for the null data to one or more group members, and (iv) using the null data and the playback timing for the null data, in combination with audio information and playback timing for the audio information, to play audio content based on the audio information and the null data in synchrony with the one or more group members. In some embodiments, the group coordinator additionally or alternatively resynchronizes playback of audio content by the synchrony group members in response to determining and/or detecting one or more problems with the incoming stream of audio information via the audio source.

V. Technical Features

In some embodiments, at least some aspects of the technical solutions derive from the technical structure and organization of the audio information, the playback timing, and clock timing information that the playback devices use to play audio content from audio sources in synchrony with each other, including how different playback devices generate playback timing based on clock timing and play audio content based on playback timing and clock timing.

Therefore, to aid in understanding certain aspects of the disclosed technical solutions, certain technical details of the audio information, playback timing, and clock timing information, as well as how playback devices generate and/or use playback timing and clock timing for playing audio content are described below. Except where noted, the technical details of the audio information, playback timing, and clock timing information described below are the same or at least substantially the same for the examples shown and described herein with reference to FIGS. 7, 8, and 9.

a. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In operation, a group coordinator (sometimes referred to as a "sourcing" playback device) obtains any of the aforementioned types of audio content from an audio source via an interface on the playback device, e.g., one of the sourcing playback device's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital audio content.

A playback device that receives or otherwise obtains audio information from an audio source for playback and/or distribution to other playback devices is sometimes referred to herein as the group coordinator or "sourcing" playback device. One function of the group coordinator of a synchrony group is to process received audio information for playback and/or distribution to group members of the synchrony group for synchronous playback. In some embodiments, the group coordinator transmits the processed audio information to all the other group members in the synchrony group that the group coordinator is configured to control. In some embodiments, the group coordinator transmits the audio information to a multicast network address, and all the other playback devices configured to play the audio content (i.e., the group members of the synchrony group) receive the audio information via that multicast address. In some embodiments, the group coordinator transmits the audio information to each unicast network address of each other playback device configured to play the audio content (i.e., the group members), and each of the other playback devices configured to play the audio content (i.e., the group members) receive the audio information via its unicast address.

As described above, in some BLUETOOTH line-in embodiments (as well as other embodiments), the group coordinator receives audio information from an audio source in digital form, e.g., via a stream of packets, sometimes referred to herein as a first stream or an incoming stream. In some embodiments, individual packets in the first stream have a sequence number or other identifier that specifies an ordering of the packets. In operation, the group coordinator uses the sequence number or other identifier to detect missing packets and/or to reassemble the packets of the first stream in the correct order before performing further processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out.

For example, in BLUETOOTH line-in embodiments, individual packets include both a timestamp and a sequence number. The timestamp is used to place the incoming packets of audio information in the correct order, and the sequence number is mainly used to detect packet losses. In operation, the sequence numbers increase by one for each Real-time Transport Protocol (RTP) packet transmitted from the BLUETOOTH transmitter, and timestamps increase by the time "covered" by an RTP packet. In instances where a portion of audio content is split across multiple RTP packets, multiple RTP packets can have the same timestamp.

In some embodiments, the group coordinator does not change the sequence number or identifier of a received packet during processing. In some embodiments, the group coordinator reorders at least a first set packets in a packet stream based on each packet's sequence identifier, extracts audio information from the received packets, reassembles a bitstream of audio information from the received packets, and then repacketizes the reassembled bitstream into a second set of packets (sometimes referred to herein as a second stream), where packets in the second set of packets have sequence numbers and/or timestamps that differ from the sequence numbers and/or timestamps of the packets in the first set of packets (or first stream).

In some embodiments, individual packets in the second stream are a different length (i.e., shorter or longer) than individual packets in the first stream. In some embodiments, reassembling a bitstream from the incoming packets and then subsequently repacketizing the reassembled bitstream into a different set of packets facilitates uniform processing and/or transmission of audio content by the group coordinator and by the group members that receive the audio information from the group coordinator. However, for some delay-sensitive audio information, reassembly and repacketization may be undesirable, and therefore, in some embodiments, the group coordinator may not perform reassembly and repacketization for some (or all) audio information that it receives before playing the audio information and/or transmitting the audio information to other playback devices/group members.

In some embodiments an audio source provides audio information in digital form to a group coordinator, e.g., via a digital line-in interface. In such embodiments, the group coordinator packetizes the digital audio into packets of audio information before transmitting the audio information to other playback devices. In some embodiments, individual packets comprise a sequence number or other identifier so that, when other playback devices receive the audio information, those other playback devices will be able to reliably arrange the received packets in the correct order before performing further packet processing.

After obtaining audio information from an audio source or from another playback device, a playback device in some embodiments one or more of (i) plays audio content based on the audio information individually, (ii) plays the content based on the audio information in synchrony with one or more additional playback devices, and/or (iii) transmits the audio information to one or more other playback devices.

b. Playback Timing

The playback devices disclosed and described herein use playback timing to play audio content in synchrony with each other. An individual playback device can generate playback timing and/or playback audio content according to playback timing, based on the playback device's configuration in the media playback network and/or synchrony group. The sourcing playback device (acting as a synchrony group coordinator) that generates the playback timing for audio content also transmits that generated playback timing to all the playback devices that are configured to play the audio content (the synchrony group members). In some embodiments, the synchrony group coordinator transmits the playback timing to a multicast network address, and all the other playback devices (the synchrony group members) configured to play the audio content receive the playback timing via that multicast address. In some embodiments, the synchrony group coordinator alternatively transmits the playback timing to each unicast network address of each synchrony group member, and each synchrony group member receives the playback timing via its own unicast address.

In some embodiments, the playback timing is generated for individual frames (or packets) of audio information. As described above, in some embodiments, the audio information is packaged in a series of frames (or packets) where individual frames (or packets) comprise a portion of the audio information. In some embodiments, the playback timing for the audio information includes a playback time for each frame (or packet) of audio information. In some embodiments, the playback timing for an individual frame (or packet) is included within the frame (or packet), e.g., in the header of the frame (or packet), in an extended header of the frame (or packet), and/or in the payload portion of the frame (or packet). As described further herein, an individual frame (or packet) may include one or more portions of audio information and/or one or more null portions.

In some embodiments, the playback time for an individual frame (or packet) is identified within a timestamp or other indication. In such embodiments, the timestamp (or other indication) represents a time to play the one or more portions of audio information and/or the one or more null portions within that individual frame (or packet). In some embodiments, the timestamp or other indication is relative to an "origin" time that functions as a reference start time from which the playback timing is generated for an individual audio program and/or a synchronous playback session.

In operation, when the playback timing for an individual frame (or packet) is generated, the playback timing for that individual frame (or packet) is a future time relative to a "current clock time" of a reference clock at the time that the playback timing for that individual frame (or packet) is generated. In some embodiments, the "current clock time" used for creating playback timing for the first frame (or packet) comprising audio content for playback in a synchronous playback session is the "origin" time. In some embodiments, if (or when) the group coordinator determines that audio playback by the playback devices in the synchrony group requires resynchronization, then the group coordinator resynchronizes playback by setting a new "origin" time and generating new playback timing for individual frames (or packets) comprising audio content. As described in more detail below, the reference clock can be a "local" clock at the group coordinator or a "remote" clock at a separate network device, e.g., another playback device, a computing device, or another network device configured to provide clock timing for use by playback devices to generate playback timing and/or playback audio content.

In operation, a playback device tasked with playing particular audio content will play the portion(s) of the particular audio content (or, if applicable, one or more null portions) within an individual frame (or packet) at the playback time specified by the playback timing for that individual frame (or packet), as adjusted to accommodate for differences between the clock timing information and a clock at the playback device that is tasked with playing the audio content, as describe in more detail below.

c. Clock Timing

The playback devices disclosed and described herein use clock timing to generate playback timing for audio information and to play the audio content based on the audio information and the generated playback timing.

In some embodiments, the group coordinator uses clock timing from a reference clock (e.g., a device clock, a digital-to-audio converter clock, a playback time reference clock, or any other clock) to generate playback timing for audio information that the group coordinator receives from an audio source. The reference clock can be a "local" clock at the group coordinator or a "remote" clock at a separate network device, e.g., another playback device, a computing device, or another network device configured to provide clock timing for use by (i) a group coordinator to generate playback timing and/or (ii) the group coordinator and group members to play back audio content.

In some embodiments, all of the playback devices tasked with playing particular audio content in synchrony (i.e., all the group members in a synchrony group) use the same clock timing from the same reference clock to play back that particular audio content in synchrony with each other. In some embodiments, playback devices use the same clock timing to play audio content that was used to generate the playback timing for the audio content. The reference clock may be a local clock of the group coordinator, but the reference clock could also be a clock at a different device, including a different playback device.

In operation, the device that generates the clock timing also transmits the clock timing to all the playback devices in the network that need to use the clock timing for generating playback timing and/or playing back audio content. In some embodiments, the device that generates the clock timing transmits the clock timing to a multicast network address, and all the playback devices configured to generate playback timing (e.g., the group coordinator) and/or play audio content (e.g., the group coordinator and/or the group members) receive the clock timing via that multicast address. In some embodiments, the device alternatively transmits the clock timing to each unicast network address of each playback device in the synchrony group.

In some embodiments, the device that generates the clock timing is a playback device configured to operate as the group coordinator for the synchrony group. And in operation, the group coordinator of the synchrony group transmits the clock timing to all the group members of the synchrony group. The group coordinator and the group members all use the clock timing and the playback timing to play audio content in synchrony with each other as described herein.

d. Generating Playback Timing by the Group Coordinator

In some embodiments, one playback device is configured as the group coordinator for a synchrony group. In such embodiments, the group coordinator: (i) generates playback timing for audio information based on clock timing from a local clock at the group coordinator, and (ii) transmits the generated playback timing to all the other group members in the synchrony group. In operation, when generating playback timing for an individual frame (or packet), the group coordinator adds a "timing advance" to the current clock time of a local clock at the group coordinator that the group coordinator is using for generating the playback timing. As mentioned above, when starting a synchronous playback session, the group coordinator in some embodiments generates playback timing based on an "origin" time, which is the first "current clock time" to which the group coordinator adds the "timing advance" to generate the playback time for the first frame (or packet) in the stream of frames (or packets) that the group coordinator transmits to the playback devices in the synchrony group at the start of the synchronous playback session.

In some embodiments, the "timing advance" is based on an amount of time that is greater than or equal to the sum of (i) the network transit time required for frames and/or packets comprising audio information transmitted from the group coordinator to arrive at all the other group members and (ii) the amount of time required for all the other group members to process received frames/packets from the group coordinator for playback.

In some embodiments, the group coordinator determines a timing advance by sending one or more test packets to one or more (or perhaps all) of the other group members, and then receiving test response packets back from those one or more group members. In some embodiments, the group coordinator and the one or more group members negotiate a timing advance via multiple test and response messages. In some embodiments with more than two group members, the group coordinator determines a timing advance by exchanging test and response messages with all of the group members, and then setting a timing advance that is sufficient for the group member having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined, or at least constant for the duration of a synchronous playback session. In other embodiments, the group coordinator can change the timing advance in response to a request from a group member indicating that a greater timing advance is required (e.g., because the group member is not receiving packets comprising portions of audio content until after one or more other group members have already played the portions of audio content) or a shorter timing advance would be sufficient (e.g., because the group member is buffering more packets comprising portions of audio content than necessary to provide consistent, reliable playback).

As described in more detail below, all the playback devices configured to play the audio content in synchrony will use the playback timing and the clock timing to play the audio content in synchrony with each other.

e. Generating Playback Timing with Clock Timing from a Remote Clock

In some embodiments, the group coordinator may generate playback timing for audio information based on clock timing from a remote clock at another network device, e.g., another playback device, another computing device (e.g., a smartphone, laptop, media server, or other computing device configurable to provide clock timing sufficient for use by the group coordinator generate playback timing and/or playback audio content). Generating playback timing based on clock timing from a remote clock at another network device is more complicated than generating playback timing based on clock timing from a local clock in embodiments where the same clock timing is used for both (i) generating playback timing and (ii) playing audio content based on the playback timing.

In embodiments where the group coordinator generates playback timing for audio information based on clock timing from a remote cock, the playback timing for an individual frame (or packet) is based on (i) a "timing offset" between (a) a local clock at the group coordinator that the group coordinator uses for generating the playback timing and (b) the clock timing information from the remote reference clock, and (ii) a "timing advance" based on an amount of time that is greater than or equal to the sum of (a) the network transit time required for packets transmitted from the group coordinator to arrive at the group members and (b) the amount of time required for all of those group members to process frames and/or packets comprising audio information received from the group coordinator for playback.

For an individual frame (or packet) containing a portion(s) of the audio information, the group coordinator generates playback timing for that individual frame (or packet) by adding the sum of the "timing offset" and the "timing advance" to a current time of the local clock at the group coordinator that the group coordinator uses to generate the playback timing for the audio information. In operation, the "timing offset" may be a positive or a negative offset, depending on whether the local clock at the group coordinator is ahead of or behind the remote clock providing the clock timing. The "timing advance" is a positive number because it represents a future time relative to the local clock time, as adjusted by the "timing offset." As mentioned above, when starting a synchronous playback session, the group coordinator in some embodiments generates playback timing based on an "origin" time, which is the first "current clock time" to which the group coordinator adds the sum of the "timing advance" and the "timing offset" to generate the playback time for the first frame (or packet) in the stream of frames (or packets) that the group coordinator transmits to the playback devices in the synchrony group at the start of the synchronous playback session.

By adding the sum of the "timing advance" and the "timing offset" to a current time of the local clock at the group coordinator that the group coordinator is using to generate the playback timing for the audio information, the group coordinator is, in effect, generating the playback timing relative to the remote clock.

In some embodiments, and as described above, the "timing advance" is based on an amount of time that is greater than or equal to the sum of (i) the network transit time required for frames and/or packets comprising audio information transmitted from the group coordinator to arrive at all other group members and (ii) the amount of time required for all the other group members to process received frames/packets from the sourcing playback device for playback.

In some embodiments, the group coordinator determines a timing advance via signaling between the group coordinator and one or more group members, as described previously. Further, in some embodiments, the timing advance is less than about 50 milliseconds, less than about 20-30 milliseconds, or less than about 10 milliseconds, depending on the audio content playback latency requirements because different audio content may have different latency requirements. For example, audio content having associated video content may have lower latency requirements than audio content that does not have associated video content because audio content associating with video content must be synchronized with its corresponding video content whereas audio content that is not associated with video content need not be synchronized with any corresponding video content. In some embodiments, the timing advance remains constant after being determined, or at least constant for the duration of a synchronous playback session. And in some embodiments, the group coordinator can change the timing advance based on further signaling between the group coordinator (generating the playback timing) and one or more group members (that are using the playback timing to play audio content).

As described in more detail below, all the playback devices configured to play the audio content in synchrony will use the playback timing and the clock timing to play the audio content in synchrony with each other.

f. Playing Audio Content using Local Playback Timing and Local Clock Timing

In some embodiments, the group coordinator is configured to play audio content in synchrony with one or more group members. And if the group coordinator is using clock timing from a local clock at the group coordinator to generate the playback timing, then the group coordinator will play the audio content using locally-generated playback timing and the locally-generated clock timing. In operation, the group coordinator plays an individual frame (or packet) comprising portions of the audio information (or null portions, where applicable) when the local clock that the group coordinator used to generate the playback timing reaches the time specified in the playback timing for that individual frame (or packet).

For example, recall that when generating playback timing for an individual frame (or packet), the group coordinator device adds a "timing advance" to the current clock time of the reference clock used for generating the playback timing. In this instance, the reference clock used for generating the playback timing is a local clock at the group coordinator. So, if the timing advance for an individual frame is, for example, 30 milliseconds, then the group coordinator plays the portion (e.g., a sample or set of samples) of audio information (or plays a null portion, if applicable) in an individual frame (or packet) 30 milliseconds after creating the playback timing for that individual frame (or packet).

In this manner, the group coordinator plays audio content based on the audio information by using locally-generated playback timing and clock timing from a local reference clock at the group coordinator. As described further below, by playing the portion(s) of the audio information of an individual frame and/or packet when the clock time of the local reference clock reaches the playback timing for that individual frame or packet, the group coordinator plays that portion(s) of the audio content (or null portion) corresponding to the audio information in that individual frame and/or packet in synchrony with other group members in the synchrony group.

g. Playing Audio Content using Local Playback Timing and Remote Clock Timing

As mentioned earlier, in some embodiments, a group coordinator generates playback timing for audio information based on clock timing from a remote clock, i.e., a clock at another network device separate from the group coordinator, e.g., another playback device, or another computing device (e.g., a smartphone, laptop, media server, or other computing device configurable to provide clock timing sufficient for use by a playback device generate playback timing and/or playback audio content). Because the group coordinator used clock timing from the remote clock to generate the playback timing for the audio content, the group coordinator also uses the clock timing from the remote clock to play the audio content. In this manner, the group coordinator plays audio content using the locally-generated playback timing and the clock timing from the remote clock.

Recall that, in embodiments where the group coordinator generates playback timing for audio content based on clock timing from a remote clock, the group coordinator generates the playback timing for an individual frame (or packet) based on (i) a "timing offset" based on a difference between (a) a local clock at the group coordinator and (b) the clock timing information from the remote clock, and (ii) a "timing advance" comprising an amount of time that is greater than or equal to the sum of (a) the network transit time required for frames/packets transmitted from the group coordinator to arrive at all the group members and (b) the amount of time required for all of the group members to process frames and/or packets comprising audio information received from the group coordinator for playback. And further recall that the group coordinator transmits the generated playback timing to all of the group members in the synchrony group tasked with playing the audio content in synchrony.

In this scenario, to play an individual frame (or packet) of audio content in synchrony with the one or more other playback devices, the group coordinator subtracts the "timing offset" from the playback timing for that individual frame (or packet) to generate a "local" playback time for playing the audio content based on the audio information within that individual frame (or packet). After generating the "local" playback time for playing the portion(s) of the audio content corresponding to the audio information within the individual frame (or packet), the group coordinator plays the portion(s) of the audio content corresponding to the audio information in the individual frame (or packet) when the local clock (at the sourcing playback device) that the group coordinator is using to play the audio content (which is the same local clock that the group coordinator used to generate the playback timing) reaches the "local" playback time for that individual frame (or packet). By subtracting the "timing offset" from the playback timing to generate the "local" playback time for an individual frame, the group coordinator effectively plays the portion(s) of audio content corresponding to the audio information in that frame/packet with reference to the clock timing from the remote clock.

h. Playing Audio Content using Remote Playback Timing and Local Clock Timing

Recall that, in some embodiments, the group coordinator transmits the audio information and the playback timing for the audio information to one or more group members. If the group member that receives (i.e., the receiving group member) the audio information and playback timing from the group coordinator is the same group member that provided clock timing information to the group coordinator that the group coordinator used for generating the playback timing, then the receiving group member in this instance plays audio content using the audio information and playback timing received from the group coordinator (i.e., remote playback timing) and the group member's own clock timing (i.e., local clock timing). Because the group coordinator used clock timing from a clock at the receiving group member to generate the playback timing, the receiving group member also uses the clock timing from its local clock to play the audio content. In this manner, the receiving group member plays audio content using the remote playback timing (i.e., from the group coordinator) and the clock timing from its local clock (i.e., its local clock timing).

To play an individual frame (or packet) of the audio information in synchrony with the group coordinator (and every other playback device that receives the playback timing from the group coordinator and clock timing from the receiving group member), the receiving group member (i) receives the frames (or packets) comprising the portions of the audio information (and also null portions, if applicable) from the group coordinator, (ii) receives the playback timing for the audio information (and null portions, if applicable) from the group coordinator (e.g., in the frame and/or packet headers of the frames and/or packets comprising the portions of the audio information and null content or perhaps separately from the frames and/or packets comprising the portions of the audio information and null content), and (iii) plays the portion(s) of the audio information in the individual frame (or packet) when the local clock that the receiving group member used to generate the clock timing reaches the playback time specified in the playback timing for that individual frame (or packet) received from the group coordinator.

Because the group coordinator uses the "timing offset" (which is the difference between the clock timing at the receiving group member and the clock timing at the group coordinator in this scenario) when generating the playback timing, and because this "timing offset" already accounts for differences between timing at the group coordinator and the receiving group member, the receiving group member in this scenario plays individual frames (or packets) comprising portions of the audio information (and null portions, if applicable) when the receiving group member's local clock (that was used to generated the clock timing) reaches the playback time for an individual frame (or packet) specified in the playback timing for that individual frame (or packet).

And because the receiving group member plays frames (or packets) comprising portions of the audio information (and null portions, if applicable) according to the playback timing, and because the group coordinator plays the same frames (or packets) comprising portions of the audio information (and null portions, if applicable) according to the playback timing and the determined "timing offset," the receiving group member and the group coordinator play the same frames (or packets) comprising audio information corresponding to the same portions of audio content in synchrony, i.e., at the same time or at substantially the same time.

i. Playing Audio Content Using Remote Playback Timing and Remote Clock Timing

Recall that, in some embodiments, the sourcing playback device (e.g., which in many cases may be the group coordinator) transmits the audio information and the playback timing for the audio information to one or more other playback devices in the synchrony group. And further recall that, in some embodiments, the network device providing the clock timing can be a different device than the playback device providing the audio information and playback timing (i.e., the sourcing playback device, which in many cases may be the group coordinator). Playback devices that receive the audio information, the playback timing, and the clock timing from one or more other devices are configured to playback the audio content using the playback timing from the device that provided the playback timing (i.e., remote playback timing) and clock timing from a clock at the device that provided the clock timing (i.e., remote clock timing). In this manner, the receiving playback device in this instance plays audio content based on audio information by using remote playback timing and remote clock timing.

To play an individual frame (or packet) of the audio information in synchrony with every other playback device tasked with playing audio content in synchrony, the receiving playback device (i) receives the frames (or packets) comprising the portions of the audio information, (ii) receives the playback timing for the audio information (e.g., in the frame and/or packet headers of the frames and/or packets comprising the portions of the audio information or perhaps separately from the frames and/or packets comprising the portions of the audio information), (iii) receives the clock timing, and (iv) plays the portion(s) of the audio information in the individual frame (or packet) when the local clock that the receiving playback device uses for audio content playback reaches the playback time specified in the playback timing for that individual frame (or packet), as adjusted by a "timing offset."

In operation, after the receiving playback device receives clock timing, the receiving device determines a "timing offset" for the receiving playback device. This "timing offset" comprises (or at least corresponds to) a difference between the "reference" clock that was used to generate the clock timing and a "local" clock at the receiving playback device that the receiving playback device uses to play the audio content. In operation, each playback device that receives the clock timing from another device calculates its own "timing offset" based on the difference between its local clock and the clock timing, and thus, the "timing offset" that each playback device determines is specific to that particular playback device.

In some embodiments, when playing back the audio content, the receiving playback device generates new playback timing (specific to the receiving playback device) for individual frames (or packets) of audio information (and null portions, when applicable) by adding the previously determined "timing offset" to the playback timing for each receiving frame (or packet) comprising portions of audio information and/or null portions. With this approach, the receiving playback device converts the playback timing for the received audio information/null portions into "local" playback timing for the receiving playback device. Because each receiving playback device calculates its own "timing offset," each receiving playback device's determined "local" playback timing for an individual frame is specific to that particular playback device.

And when the "local" clock that the receiving playback device is using for playing back the audio content reaches the "local" playback time for an individual frame (or packet), the receiving playback device plays the audio information (or portions thereof) or null content (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the receiving playback device plays frames (or packets) comprising portions of the audio information and/or null content (when applicable) according to the playback timing as adjusted by the "timing offset" relative to the clock timing, and because the device providing the playback timing generated the playback timing for those frames (or packets) relative to the clock timing and plays the same frames (or packets) comprising portions of the audio information (or null content) according to the playback timing and its determined "timing offset," the receiving playback device and the device that provided the playback timing (e.g., the group coordinator in some embodiments) play the same frames (or packets) comprising the same portions of the audio information and/or null portions in synchrony, i.e., at the same time or at substantially the same time.

VI. Example Embodiments

The example embodiments described below illustrate playback devices in various networking scenarios synchronizing playback of audio information received from unreliable audio information sources in some embodiments.

Figure 7:
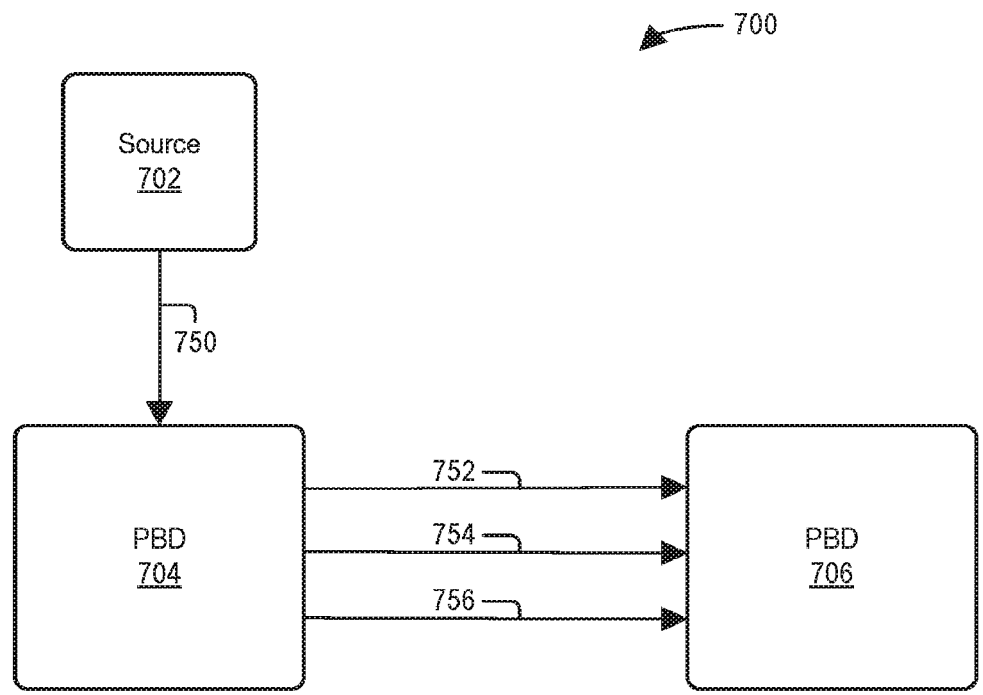
FIG. 7 shows an example configuration of two playback devices playing audio received from a source in synchrony with each other according to some embodiments.

FIG. 7 shows an example configuration 700 of two playback devices 704, 706 playing audio content received from an unreliable audio information source 702 in synchrony with each other according to some embodiments.

Configuration 700 in FIG. 7 includes a first playback device 704, a second playback device 706, and an audio source 702. The arrows shown in configuration 700 indicate signal flow for timing information and media content.

Playback devices 704 and 706 are the same as or similar to the playback devices shown and described herein. In some embodiments, one or both of playback devices 704 and 706 are or comprise a networked microphone device.

In some embodiments, the first playback device 704 and the second playback device 706 are configured in a synchrony group, where the first playback device 704 and the second playback device 706 play the same audio content in synchrony with each other, as described earlier.

In some embodiments, the first playback device 704 and the second playback device 706 are configured as a stereo pair, where the first playback device 704 is configured to play a left channel of stereo audio content and the second playback device 706 is configured to play a right channel of the stereo audio content (or vice versa).

And in further embodiments, the first playback device 704 and the second playback device 706 are configured as a bonded pair, where the first playback device 704 plays a first set of frequency components of audio content, while the second playback device 706 plays a second set of frequency components of the audio content.

And in still further embodiments, the first playback device 704 and the second playback device 706 are configured in other grouped arrangements now known or later developed, where the first playback device 704 and the second playback device 706 play different channels and/or sets of frequency components of the same audio content in synchrony with each other.

In some embodiments, the first playback device 704 and the second playback device 706 need not be grouped in any particular manner (e.g., a synchrony group, stereo pair, bonded pair, consolidated device, etc.) to play audio content in synchrony with each other. Rather, in some embodiments, even if the first playback device 704 and the second playback device 706 are not in a grouped configuration, but instead are just communicatively coupled to each other via a network (e.g., in the same home), the first playback device 704 and the second playback device 706 can play certain audio content (e.g., home intercom, telephone/doorbell notifications, etc.) in synchrony with each other according to shared playback timing and clock timing as described herein.

In some embodiments, the audio source 702 is the same as or similar to any of the audio sources disclosed and described herein.

In example configuration 700, the first playback device 704 is the "sourcing" playback device for the first audio content 750 and, in some embodiments, operates as a group coordinator for the synchrony group comprising the first playback device 704 and the second playback device 706. The synchrony group in example 700 is shown as including only the first playback device 704 and the second playback device 706. In operation, the synchrony group can include more than two playback devices.

In operation, the first playback device 704 (i) receives audio information 750 from the audio source 702 via a communications link between the audio source 702 and the first playback device 704, (ii) provides audio information 752 to the second playback device 706 (and possibly additional playback devices (not shown)), and (iii) plays audio content based on the audio information 752 in synchrony with the second playback device 706 (and possibly additional playback devices (not shown)).

In some embodiments, the communications link between the audio source 702 and the first playback device 704 is a BLUETOOTH communication link. However, the communication link between the audio source 702 and the first playback device 704 can be any communication link now known or later developed that is suitable for transmitting audio data.

In operation, in example 700 shown in FIG. 7, the source 702 transmits a stream of data comprising packets of encoded audio information 750 to the first playback device 704 via a BLUETOOTH wireless link. In some embodiments, the stream of data comprises frames or cells of audio information 750. In some embodiments, the stream of data comprises any other type of data package formatting now known or later developed that is suitable for transmitting data.

The first playback device 704 receives the stream of packets comprising the encoded audio information 750 from the source 702 and extracts the encoded audio information 750 from the incoming stream on a packet-by-packet basis. That is, when the first playback device 704 receives a first packet comprising the encoded audio information 750 from the source 702, the first playback device 704 extracts the portion(s) of encoded audio information 750 contained within that packet. The first playback device 704 continues to extract the encoded audio information 750 from the packets as they arrive (or substantially as they arrive) on a packet-by-packet basis (or frame-by-frame or cell-by-cell, depending on how the encoded audio information 750 is packaged).

While the first playback device 704 continues to receive the first stream of data comprising the encoded audio information 750 (i.e., the incoming stream) and extract the encoded audio information 750 from the incoming stream, the first playback device 704 generates and transmits a second stream of data (i.e., the outgoing stream) comprising portions of extracted audio information 752 to at least the second playback device 706 (and perhaps also to additional playback devices (not shown)). In example 700, the first playback device 704 transmits the second stream (the outgoing stream) comprising portions of extracted audio information 752 to the second playback device 706 via a WIFI communications link. However, the second stream could be transmitted by any type of communications link now known or later developed that is suitable for transmitting data. In some embodiments, the first playback device 704 (i) receives the incoming stream from the audio source 702 via a first wireless interface, and (ii) transmits the outgoing stream to at least the second playback device 706 via a second wireless interface that is different than the first wireless interface.

In example 700, because BLUETOOTH and WIFI are different transmission protocols, the outgoing stream has a different framing format than the incoming stream. In this manner, the first playback device 704 (i) receives audio information 750 via an incoming data stream which has a first framing format (e.g., BLUETOOTH), and (ii) generates and transmits audio information 752 to one or more other playback devices via an outgoing stream which has a second framing format (e.g., Wi-Fi).

Because BLUETOOTH and WIFI both operate in the 2.4 GHz band, and because WIFI tends to have higher transmission power levels than BLUETOOTH, the first playback device's 704 transmission of the outgoing stream via WIFI may cause interference with the first playback device's 704 receipt of the incoming stream via BLUETOOTH. Therefore, in some embodiments, the first playback device 704 (i) receives audio information 750 via an incoming data stream via BLUETOOTH operating in the 2.4 GHz band, and (ii) generates and transmits audio information 752 to one or more other playback devices via an outgoing stream via WIFI operating in the 5.0 GHz band. In some embodiments, however, the 5.0 GHz WIFI band may not be available for transmission, e.g., one or more playback devices and/or other network infrastructure components do not support 5.0 GHZ WIFI, the 5.0 GHZ WIFI band is too congested with other network traffic, and/or one or more playback devices are too far away to receive WIFI transmissions in the 5.0 GHz band from the first playback device 704 in a consistent and reliable manner. In such circumstances, in some embodiments, and to avoid or at least reduce the likelihood of interference between the incoming and outgoing streams, the first playback device 704 (i) receives audio information 750 via an incoming data stream via BLUETOOTH operating in a first portion of the 2.4 GHz band, and (ii) generates and transmits audio information 752 to one or more other playback devices via an outgoing stream via WIFI operating in a second portion of the 2.4 GHz band. Preferably, the first portion of the 2.4 GHz band does not overlap the second portion of the 2.4 GHz band, however, such non-overlapping configuration is not required.

In operation, the outgoing stream comprises (i) portions of the encoded audio information extracted from the incoming stream and (ii) playback timing information, wherein the playback timing information comprises playback timing for the portions of the encoded audio information extracted from the incoming stream. In some embodiments, the outgoing stream may additionally comprise clock timing information. In some embodiments, however, the first playback device 704 may transmit clock timing information to the second playback device 706 separately from the outgoing stream.

In particular, in addition to the portions of audio information 752, the first playback device 704 also transmits playback timing 754 for the portions of the audio information 752 and clock timing 756 to the second playback device 706 (and perhaps additional playback devices (not shown)). In operation, the first playback device 704 uses the playback timing 754 and the clock timing 756 to play audio content based on the audio information 752 in synchrony with at least the second playback device 706 as described herein.

In example configuration 700, and in connection with generating the outgoing stream, the first playback device 704 uses its own clock timing 756 (i.e., clock timing of a clock of the first playback device 704) to generate the playback timing 754 for the audio information 752.

In some embodiments, the first playback device 704 generates the playback timing 754 for the audio information 752 by adding a "timing advance" to a current clock time of the local reference clock that the first playback device 704 uses for generating the playback timing 754 for the audio information 752. In some embodiments, the playback timing for a frame or packet of audio information 752 corresponds to a future time, relative to a reference clock time, that the portion(s) audio information 752 in the packet (or frame) is to be played.

In some embodiments, the timing advance that the first playback device 704 adds to its own clock timing 756 to generate a future time for the playback timing 754 is based on an amount of time that is greater than or equal to the sum of (i) the network transit time required for packets transmitted from the first playback device 704 to arrive at the second playback device 706 and (ii) the amount of time required for the second playback device 706 to process received packets for playback.

In some embodiments, the first playback device 704 determines the timing advance by sending one or more test packets to the second playback device 706 and receiving test response packets back from the second playback device 706 in response to the test packets. In some embodiments, the first playback device 704 and the second playback device 706 can negotiate a timing advance via one or more test and response messages. In some embodiments with more than two playback devices, the first playback device 704 determines the timing advance by exchanging test and response messages with one or more (or all) of the playback devices, and then setting a timing advance that is sufficient for the playback device having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined, or at least constant during the duration of a synchronous playback session or perhaps constant during the duration that the synchrony group is in existence or in a particular configuration (recall that synchrony groups can be formed, changed, disbanded, etc.).

In other embodiments, the first playback device 704 can change the timing advance in response to a request from a receiving playback device indicating that (i) a greater timing advance is require, e.g., because the receiving playback device is receiving packets comprising portions of audio information 752 after the time for playing the portions (specified by the playback timing 754 for the portions of audio information 752), or because the receiving playback device is receiving portions of audio information 752 after other devices have already played the portions of audio information, or (ii) a shorter timing advance would be sufficient, e.g., because the receiving device is buffering more packets comprising portions of audio information than necessary to provide consistent, reliable playback.

After determining the playback timing 754 for a packet, frame, and/or sample of the audio information 752, the first playback device 704 transmits the packet/frame/sample of audio information 752 and the first playback timing 754 for the packet/frame/sample of audio information 752 to the second playback device 706 via the WIFI communication link. Because in example configuration 700, the first playback device 704 uses its own local clock timing to generate the playback timing 754 for the audio information 752, the first playback device 704 also transmits its clock timing 756 to the second playback device 706.

The second playback device 706 uses the clock timing 756 of the first playback device 704 and the second playback device's 706 own clock timing to generate a "timing offset." Because the second playback device 706 uses the playback timing 754 and the clock timing 756 received from the first playback device 704 to play the audio information 752, the second playback device 706 in this instance uses remote playback timing and remote clock timing to play audio content based on the audio information 752.

In some embodiments, one or more (or all) of the following steps occur in connection with the second playback device 706 generating the "timing offset" based the clock timing 756 of the first playback device 704 and the second playback device's 706 own clock timing.

First, the first playback device 704 generates a clock timing indication 756 (e.g., a timestamp or other indication) at time, t, and transmits that clock timing indication 756 to the second playback device 706. Next, when the second playback device 706 receives the clock timing indication 756 from the first playback device 704, the second playback device 706 determines the difference between a local clock at the second playback device 706 and the time, t, indicated in the clock timing indication 756. The second playback device 706 uses this determined "timing offset" to play back audio content based on portions of audio information 752 in synchrony with the first playback device 704.

In some embodiments, the first playback device 704 transmits the clock timing 756 to the second playback device 706 at least once at the start of a synchronous playback session. In some embodiments, because clocks at the first playback device 704 and the second playback device 706 are susceptible to clock drift (e.g., frequency and/or phase drift), the first playback device 704 transmits the clock timing 756 to the second playback device 706 periodically or at least more than a few times during the course of a synchronous playback session. For example, the first playback device 704 may transmit the clock timing 756 to the second playback device 706 every few milliseconds, every few tens of milliseconds, every few hundreds of milliseconds, every few seconds, every few minutes, and so on.

After transmitting at least some frames (or packets) comprising at least portions of the audio information 752, the first playback timing 754, and the clock timing 756 to the second playback device 706, the first playback device 704 and the second playback device 706 perform the following functions to play back audio content in synchrony with each other.

The first playback device 704 plays an individual frame (or packet) comprising portions of the audio information 752 when the local clock at the first playback device 704 that was used for generating the first playback timing 754 reaches the time specified in the first playback timing 754 for that individual frame (or packet) comprising the audio information 752. For example, recall that when generating playback timing for an individual frame (or packet), the "sourcing" playback device (i.e., the first playback device 704 in FIG. 7) adds a "timing advance" to the current clock time of the local reference clock used for generating the playback timing. So, if the timing advance for an individual frame is, for example, 30 milliseconds, then the first playback device 704 ultimately plays audio content corresponding to the portion (e.g., a sample or set of samples) of audio information 752 in an individual frame (or packet) 30 milliseconds after creating the playback timing for that individual frame (or packet).

And the second playback device 706 plays audio content corresponding to the audio information 752 in each frame (or packet) when the current time of a local clock (at the second playback device 706) that the second playback device 706 is using to play the audio information 752 reaches the first playback timing 754 for that frame (or packet), taking into account the previously-determined "timing offset."

Recall that the second playback device 706 calculates (or otherwise determines) a "timing offset" that corresponds to a difference between (a) the "reference" clock at the first playback device 704 that the first playback device 704 used to generate the clock timing 756 (and the first playback timing 754) and (b) the "local" clock at the second playback device 706 that the second playback device 706 uses to play the audio information 752. The second playback device 706 uses this timing offset when playing back audio content based on the audio information 752.

In particular, the second playback device 706 generates new playback timing (specific to the second playback device 706) for individual frames (or packets) of audio information 752 by adding the previously determined "timing offset" to the playback time of each frame (or packet) received from the first playback device 702. With this approach, the second playback device 704 converts the playback timing 754 for the audio information 752 received from the first playback device 704 into "local" playback timing for the second playback device 706. And when the "local" clock that the second playback device 706 is using for playing back the audio content reaches the determined "local" playback time for an individual frame (or packet), the second playback device 706 plays the audio information 752 (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the first playback device 704 plays audio content corresponding to frames (or packets) comprising portions of the audio information 752 according to the playback timing 754, and because the second playback device 706 also plays audio content corresponding to frames (or packets) comprising portions of the audio information 752 according to the same playback timing 754 and the timing offset, the audio content played by the first playback device 704 and the audio content played by second playback device 706 are played in synchrony with each other. That is, the first playback device 704 and the second playback device 706 play audio content in synchrony with each other based on the playback timing 754 and clock timing 756.

The above-described ability to receive a first stream of frames (or packets or cells) having a first framing format (or packet format or cell format) and generate a second stream of frames (or packets or cells) having a second framing format (or packet format or cell format) enables the first playback device 704 to receive audio information 750 and play audio content from a wide variety of audio sources, thereby achieving one aspect of the disclosed systems and methods by enabling the first playback device 704 to use a common format (e.g., the second framing format) for streaming audio information 752 and playback timing information 754 to at least the second playback device 706 (and perhaps also to additional playback devices) regardless of (i) the format of the first stream, and/or (ii) the sequence identifier, timestamp, or other timing and/or sequence information in the first stream.

As described above, some types of communications links are more robust than other others. For example, WIFI wireless links typically provide more consistent and reliable delivery of media content than BLUETOOTH wireless links because WIFI links tend to operate a higher transmission power and with better wireless link margins than BLUETOOTH links, and protocols typically used with WIFI (e.g., TCP/IP) tend to have better error detection and correction and more robust and sophisticated retransmission capabilities than protocols typically used with BLUETOOTH (e.g., UDP/IP). In operation, the first playback device 704 cannot transmit audio information to the second playback device 706 that the first playback device 704 either does not receive and/or does not receive in sufficient time to process and stream to the second playback device 706 for synchronous playback.

So, to prevent inconsistencies, delays, and errors that may exist in the incoming stream (from the source 702) from causing similar inconsistencies in the outgoing stream (to at least the second playback device 706), the first playback device 704 in some embodiments, additionally (i) determines whether the incoming stream is missing one or more portions of the encoded audio information 750, and (ii) in response to determining that the incoming stream is missing one or more portions of the encoded audio information 750, generates one or more null portions corresponding to the one or more missing portions of the encoded audio information 750.

In some embodiments, the first playback device 704 determines whether the stream of packets comprising the encoded audio information 750 received from the audio source 702 is missing one or more portions of the encoded audio information 750 based on one or more of (i) an analysis of sequence identifiers corresponding to the encoded audio information 750 in the stream received from the audio source 702, and/or (ii) an analysis of timestamps corresponding to the encoded audio information 750 in the stream received from the audio source 702.

And when the first playback device 704 generates the outgoing stream, the first playback device 704 inserts the one or more null portions into the outgoing stream with the portions of the audio information 752 at the places where the missing portions of audio information would have been, had the first playback device 704 received those portions in the incoming stream. And when the first playback device generates the playback timing 754 for the audio information 752 for the outgoing stream, the first playback device 704 also generates and assigns playback times for the one or more corresponding null portions in the second stream in the same way that the first playback device 704 assigns playback times for portions of the audio information 752.

In some embodiments, the first playback device 704 determines the duration of an individual null portion by examining sequence numbers and timestamps included with packets of audio information 750 received from the audio source 702. For example, individual RTP packets include a timestamp and a sequence number. The playback device 704 uses the BLUETOOTH timestamp and/or sequence number in each received RTP packet to detect packet losses and to place the incoming RTP packets into the correct order (sequence).

In some embodiments, the first playback device 704 uses the RTP sequence numbers to detect packet losses. The sequence numbers increase by one for each RTP packet transmitted by the audio source 702, so if the first playback device 704 is missing a sequence number in the incoming stream, then the first playback device 704 is missing a packet, i.e., the missing sequence number corresponds to a "lost" RTP packet.

The timestamps in the incoming RTP packets increase by the time "covered" by an individual RTP packet. If a frame (or other portion) of audio information 750 is split across several RTP packets, those several packets can have the same timestamp, but each packet will have a different sequence number.

In some embodiments, to determine the duration of a null portion, the first playback device 704 compares the timestamp of the RTP packet preceding a "lost packet" and the timestamp of the RTP following the "lost" packet (based on the sequence numbers), and determines the duration of the null portion based at least in part on the time difference corresponding to the difference between the timestamp of the RTP packet preceding a "lost packet" and the timestamp of the RTP following the "lost" packet.

As an aside, embodiments where the playback timing 754 includes a timestamp, the timestamps in the playback timing 754 of the outgoing stream are different than the timestamps in the incoming RTP packets (comprising the audio information 750) received from the audio source 702. As described further herein, for embodiments where the playback timing 754 includes timestamps, the timestamp in the playback timing 754 for an individual packet (or frame or cell) indicates a time to play the one or more portions of audio information 752 (or null portion(s), when applicable) corresponding to that timestamp in the playback timing 754. In contrast, the timestamp in the incoming RTP packet received from the audio source 702 refers to the time "covered" by an individual RTP packet, at least in embodiments where the incoming stream is received via a BLUETOOTH link. In some embodiments, the timestamp in an incoming packet received from the audio source 702 refers to the time that the packet was created by the audio source 702 rather the time the packet is to be played out by a playback device.

Further, when using the audio information 752 and the playback timing 754 of the outgoing stream to generate and play audio content (based on the audio information 752 of the outgoing stream) in synchrony with at least the second playback device 706, the first playback device 704 uses (i) the portions of audio information 752 in the outgoing stream, (ii) the playback timing 754 for the portions of audio information 752 in the outgoing stream, (iii) the null portions corresponding to the missing portions of audio information 750 that were missing from the incoming stream, and (iv) the playback timing 754 for the null portions inserted into the outgoing stream. In particular, the first playback device 704 (i) plays audio content corresponding to each portion of audio information 752 at the time specified by the playback timing 754 for that portion of audio information 752 when the clock that the first playback device 704 used to generate the clock timing 756 reaches the time specified by the playback timing 754 for that portion of audio information 752, and (ii) plays each null portion at the time specified in the playback timing 754 for that null portion when the clock that the first playback device 704 used to generate the clock timing 756 reaches the time specified by the playback timing 754 for that null portion.

In operation, when using the audio information 752 and the playback timing 754 received from the first playback device 704 to play audio content (based on the audio information 752) in synchrony with at least the first playback device 704, the second playback device 706 uses (i) the portions of audio information 752 received from the first playback device 704, (ii) the playback timing 754 received from the first playback device 704, (iii) the null portions generated and inserted by first playback device 704 into the data stream received from the first playback device 704, and (iv) the playback timing 754 for the null portions. In particular, the second playback device 706 (i) plays audio content corresponding to each portion of audio information 752 at the time specified by the playback timing 754 for that portion of audio information 752, as adjusted by the previously-determined "timing offset" between the second playback device's 706 clock time and the clock timing 756 received from the first playback device 704, and (ii) plays each null portion at the time specified in the playback timing 754 for that null portion, as adjusted by the previously-determined "timing offset" between the second playback device's 706 clock time and the clock timing 756 received from the first playback device 704.

In operation, this approach enables both (i) the first playback device 704 to generate and transmit a consistent outgoing stream to at least the second playback device 706 (and perhaps additional playback devices), and (ii) at least the second playback device 706 (and perhaps additional playback devices) to receive a consistent stream from the first playback device 704 (i.e., the outgoing stream generated by the first playback device 704).

Although example 700 shows and describes a scenario where the first playback device 704 transmits the audio information 752, null portions, playback timing 754, and clock timing 756 to the second playback device 706, in other embodiments, the first playback device 704 transmits the audio information 752, null portions, playback timing 754, and clock timing 756 to one or more additional playback devices.

For example, in embodiments where the first playback device 704 is or comprises a surround sound controller (e.g., a sound bar) that distributes audio information to multiple surround sound playback devices, the first playback device 704 may be configured to transmit the audio information 752 (or portions thereof), null portions, playback timing 754, and clock timing 756 to one or more additional playback devices, including but not limited to (i) one or more left satellite playback devices, (ii) one or more right satellite playback devices, (iii) one or more subwoofer playback devices, (iv) one or more overhead satellite playback devices, and/or (v) additional playback devices in a synchrony group configured to play surround sound content in synchrony with the sound bar and the other playback devices in the synchrony group.

Additionally, although the example 700 shows and describes a scenario where the first playback device 704 generates playback timing 754 based on its local clock timing, in other embodiments, the first playback device 704 may generate playback timing 754 based on remote clock timing (as described above). Similarly, the first playback device 704 may receive and distribute playback timing 754 and clock timing information 756 received from another device (as described above).

In some embodiments, in addition to generating and inserting null portions and playback timing 754 for null portions into the outgoing data stream that the first playback device 704 transmits to the second playback device 706 (and possibly to additional playback devices (not shown)), the first playback device 704 additionally informs the second playback device 706 that the stream of packets comprising the audio information 752 may comprise more than a threshold quantity of null portions. And in some embodiments, the first playback device 704 may additionally or alternatively inform the second playback device 706 that a time interval between when the second playback device 706 receives one portion of the encoded audio information 752 and when the second playback device 706 receives a subsequent portion of the encoded audio information 752 may exceed a threshold duration. In operation, the first playback device 704 may send one or more control messages to inform the second playback device 706 that the second playback device 706 may receive more than a threshold quantity of null portions and/or that the second playback device 706 is likely to experience delays between receiving portions of audio information from the first playback device 704.

In some embodiments, in response to receiving one or more control messages from the first playback device 704 about receiving more than a threshold quantity of null portions and/or the likelihood of experiencing delays between receiving portions of audio information 752, the second playback device 706 switches to operating in a resynchronization hold off mode.

During normal operation, the second playback device 706 may initiate a resynchronization procedure in response to any one or more of: (i) failing to receive portions of audio information 752 from the first playback device 704 for some first threshold duration of time, (ii) experiencing delays between receiving portions of audio information 752 from the first playback device 704 that exceed a second threshold duration of time, (iii) receiving more than a first threshold quantity of portions of audio information 752 out of order, and/or (iv) receiving (or failing to receive) portions of audio information 752 from the first playback device 704 in a manner that affects the second playback device's 706 ability to consistently and/or reliably reassemble the portions of audio information 752 and/or play audio content based on the audio information 752.

In some embodiments, the resynchronization procedure may include, among other functions, determining a new "timing offset" between (a) the clock timing information 756 received from the first playback device 704 and (b) the second playback device's 706 local clock. Recall that the second playback device 706 uses the "timing offset" to convert the playback timing 754 information received from the first playback device 704 into "local playback timing" that is specific to the second playback device 706. The resynchronization procedure in some embodiments may additionally or alternatively include "flushing," deleting, de-indexing, or otherwise removing packets (or frames) comprising audio information with associated playback timing information that the second playback device 706 previously (i) received from the first playback device 704 and (ii) stored in a buffer at the second playback device 706 and queued for playback by the second playback device 706 according to the playback timing, e.g., when the second playback device's 706 local clock advanced to the playback time(s) for the audio sample(s) stored in the second playback device's 706 buffer.

When the second playback device 706 performs the resynchronization procedure during synchronous playback, the listener may in some instances, hear an echo effect or a brief period of silence (a "drop out") via the second playback device 706. For example, a change in the "timing offset" may cause the second playback device 704 to (i) skip over (not playback) portions of audio information 752 resulting in a drop out (e.g., because the clock at the second playback device 706 has been running faster than the clock at the first playback device 704, thereby causing an increase in the timing offset), or (ii) perhaps repeat (play again) portions of audio information 752 resulting in an echo (e.g., because the clock at the second playback device 706 has been running slower than the clock at the first playback device 704, thereby causing a decrease in the timing offset). Although a brief echo or drop out may not be distracting if it occurs rarely, frequent echoes and drop outs can be very annoying to a listener.

The resynchronization hold off mode helps avoid unnecessary resynchronizations at least in part by increasing the thresholds that would otherwise trigger the second playback device 706 to initiate the resynchronization procedure with the first playback device 704. In operation, when the second playback device 706 switches to operating in the resynchronization hold off mode, the second playback device 706 may initiate the resynchronization procedure with the first playback device 704 in response to any one or more of: (i) failing to receive portions of audio information 752 from the first playback device 704 for some third threshold duration of time that is greater than the first threshold duration of time used during normal operation (described above), (ii) experiencing delays between receiving portions of audio information 752 from the first playback device 704 that exceed a fourth threshold duration of time that is greater than the second threshold duration of time used during normal operation, (iii) receiving more than a second threshold quantity of portions of audio information 752 out of order that is greater than the first threshold quantity of out-of-order portions of audio information 752 used during normal operation, and/or (iv) receiving (or failing to receive) more (as compared to normal operation) portions of audio information 752 from the first playback device 704 in a manner that affects the second playback device's 706 ability to consistently and/or reliably reassemble the portions of audio information 752 and/or play audio content based on the audio information 752.

In some embodiments, the normal operating mode and the resynchronization hold off mode amount to (or are corresponding functional aspects of) a first operating mode and a second operating mode. In operation, the synchrony group members operate in the first operating mode while the group coordinator (or other "sourcing" device) is receiving audio information from a reliable audio source (e.g., from a WIFI source, a wired source, or any scenario where the group coordinator receives the audio information in a consistent and reliable manner) and the synchrony group members operate in the second operating mode while the group coordinator (or other "sourcing" device) is receiving audio information from an unreliable audio source (e.g., from a BLUETOOTH source or in any scenario where the group coordinator receives the audio information in an inconsistent and/or unreliable manner).

VII. Example Methods

Figure 8:
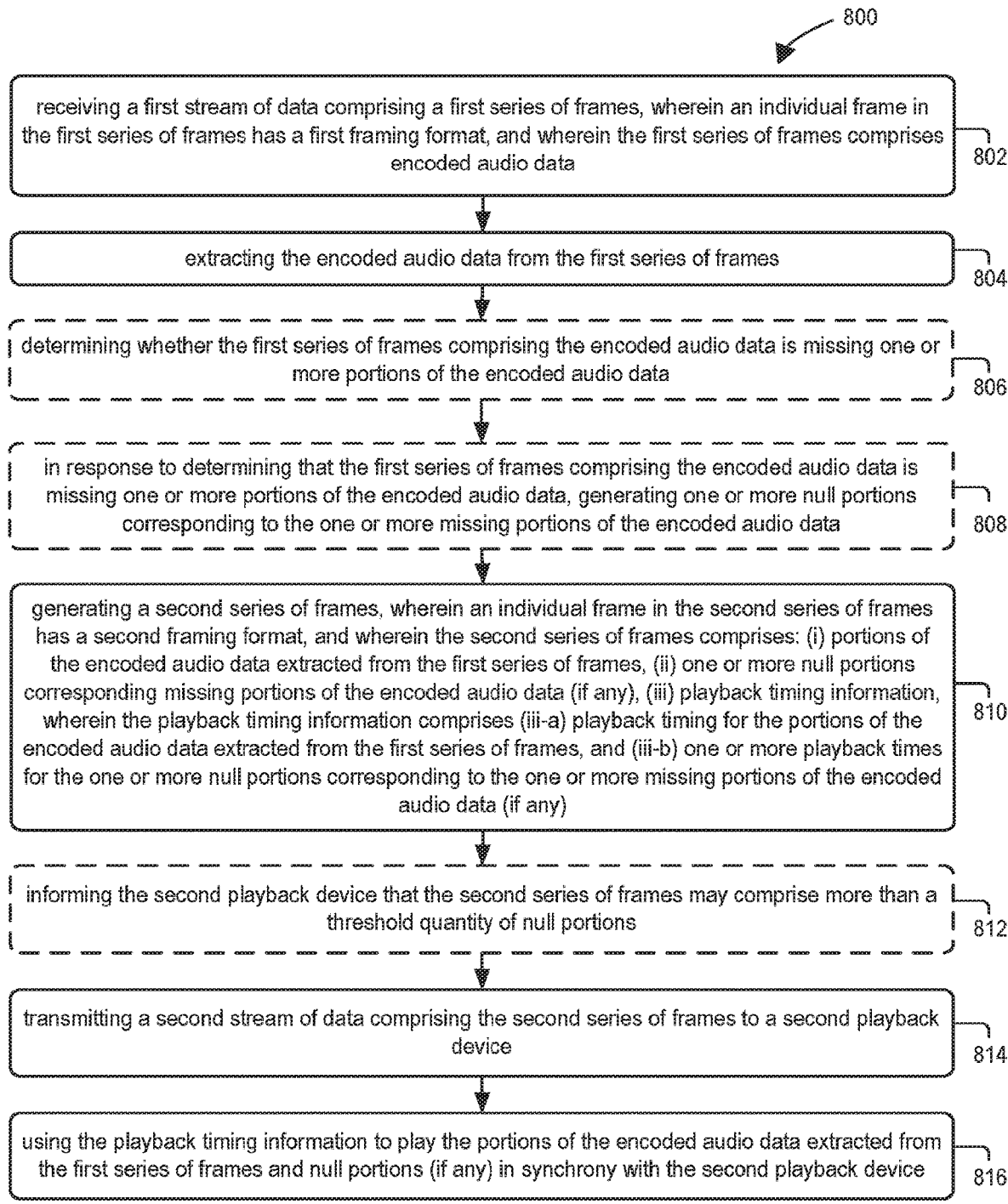
FIG. 8 shows an example method performed by a playback device for playing audio content from multiple sources according to some embodiments.

FIG. 8 shows an example method 800 performed by a playback device for playing audio content from unreliable audio sources according to some embodiments. The playback device may be the same as or similar to any of the playback devices disclosed and/or described herein, including but not limited to the first playback device 704 described with reference to FIG. 7.

Method 800 begins at block 802, which includes receiving a first stream of data comprising a first series of frames (or packets), wherein an individual frame (or packet) in the first series of frames (or packets) has a first format (e.g., a first packet format and/or a first framing format), and wherein the first series of frames (or packets) comprises encoded audio data. In some embodiments, the encoded audio data is the same as or similar to any of the audio data disclosed and described herein, including but not limited to audio information 750 described with reference to FIG. 7. In some embodiments, the first stream of data is a stream of RTP packets transmitted via a BLUETOOTH communications link.

Next, method 800 advances to block 804, which includes extracting the encoded audio data from the first series of frames (or packets).

In some embodiments, method 800 optionally includes blocks 806 and 808.

At optional block 806, method 800 includes determining whether the first series of frames (or packets) comprising the encoded audio data is missing one or more portions of the encoded audio data. In some embodiments, determining whether the first series of frames (or packets) is missing one or more portions of encoded audio data includes examining one or more of (i) sequence identifiers in individual frames (or packets) of the series of frames (or packets) received from the audio source and/or (ii) timestamps in individual frames (or packets) of the series of frames (or packets) received from the audio source. In operation, examining the sequence identifiers and/or timestamps in incoming frames (or packets) to identify missing frames (or packets) may be carried out according to any of the methods disclosed and described herein for identifying missing or lost frames/frames.

At optional block 808, method 800 includes in response to determining that the first series of frames (or packets) comprising the encoded audio data is missing one or more portions of the encoded audio data, generating one or more null portions corresponding to the one or more missing portions of the encoded audio data. In operation, the duration of an individual null portion may be determined according to any of the methods disclosed and described herein for determining the duration of time corresponding to a missing frame/packet, including but not limited to comparing sequence identifiers and/or timestamps of the frame(s)/packet(s) preceding the missing packet and the frame(s)/packet(s) following the missing frame(s)/packet(s).

Next, method 800 advances to block 810, which includes generating a second series of frames (or packets), wherein an individual frame (or packet) in the second series of frames (or packets) has a second framing format (or similar protocol-specific format), and wherein the second series of frames (or packets) comprises one or more of: (i) portions of the encoded audio data extracted from the first series of frames (or packets), (ii) one or more null portions corresponding missing portions of the encoded audio data (if any), (iii) playback timing information, wherein the playback timing information comprises (iii-a) playback timing for the portions of the encoded audio data extracted from the first series of frames (or packets), and (iii-b) one or more playback times for the one or more null portions corresponding to the one or more missing portions of the encoded audio data (if any). In some embodiment, an individual frame (or packet) in the second series of frames (or packets) comprises (i) at least one portion of the encoded audio data extracted from the first series of frames (or packets) and (ii) a playback time for the at least one portion of the encoded audio data extracted from the first series of frames (or packets) contained within the individual frame (or packet) in the second series of frames (or packets).

In some embodiments, generating the second series of frames (or packets) includes generating playback timing for audio data contained within the frames (or packets). In some embodiments, generating the playback timing information comprises generating playback timing for (i) the portions of the encoded audio data extracted from the first series of frames (or packets) and (ii) one or more null portions corresponding to one or more missing portions of the encoded audio data.

In some embodiments, generating the playback timing information for (i) the portions of the encoded audio data extracted from the first series of frames (or packets) and (ii) the one or more null portions corresponding to the one or more missing portions of the encoded audio data comprises: (A) generating a playback time for an individual portion of the encoded audio data, wherein the playback time for the individual portion of the encoded audio data comprises a future playback time, relative to a clock at the first playback device, at which the first playback device is to play the individual portion of the encoded audio data; and (B) generating a playback time for an individual null portion, wherein the playback time information for the individual null portion comprises a future playback time, relative to the clock at the first playback device, at which the first playback device is to play the individual null portion.

In some embodiments, the first framing/packet format corresponds to a BLUETOOTH format and the second framing/packet format corresponds to a WIFI format. In other embodiments, the first framing/packet format may correspond to a different protocol other than BLUETOOTH, and the second framing/packet format may correspond to a different protocol other than WIFI. In some embodiments, receiving the first stream of data comprising the first series of frames (or packets) comprises receiving the first stream of data via a first wireless interface. And in some embodiments, transmitting the second stream of data comprising the second series of frames (or packets) to the second playback device comprises transmitting the second stream of data via a second wireless interface.

In some embodiments, method 800 includes optional block 812, which includes informing the second playback device that the second series of frames (or packets) may comprise more than a threshold quantity of null portions. In some embodiments, optional block 812 may additionally or alternatively include informing the second playback device that a time interval between when the second playback device receives one portion of the encoded audio data and when the second playback device receives a subsequent portion of the encoded audio data may exceed a threshold duration.

Next, method 800 advances to block 814, which includes transmitting the second stream of data (from block 810) comprising the second series of frames (or packets) to a second playback device. In some embodiments, and as described above, an individual frame in the second series of frames (or packets) has a second framing/packet format, where the second series of frames (or packets) comprises one or more of: (i) portions of the encoded audio data extracted from the first series of frames (or packets), (ii) one or more null portions corresponding missing portions of the encoded audio data (if any), (iii) playback timing information, wherein the playback timing information comprises (iii-a) playback timing for the portions of the encoded audio data extracted from the first series of frames (or packets), and (iii-b) one or more playback times for the one or more null portions corresponding to the one or more missing portions of the encoded audio data (if any).

Next, method 800 advances to block 816, which includes using the playback timing information to play audio content based on the portions of the encoded audio data extracted from the first series of frames (or packets) and null portions (if any) in synchrony with the second playback device. In some embodiments, the first playback device uses the playback timing to play audio content based on the portions of audio information and null portions (if any) in synchrony with the second playback device according to any of the synchronous playback methods disclosed and described herein.

For example, in some embodiments, using the playback timing information to play audio content based on the portions of the encoded audio data extracted from the first series of frames (or packets) in synchrony with the second playback device comprises: (A) playing an individual portion of the encoded audio data extracted from the first series of frames (or packets) when the clock at the first playback device reaches a time indicated by the playback time for the individual portion of the encoded audio data; and (B) playing an individual null portion when the clock at the first playback device reaches a time indicated by the playback time for the individual null portion.

Figure 9:
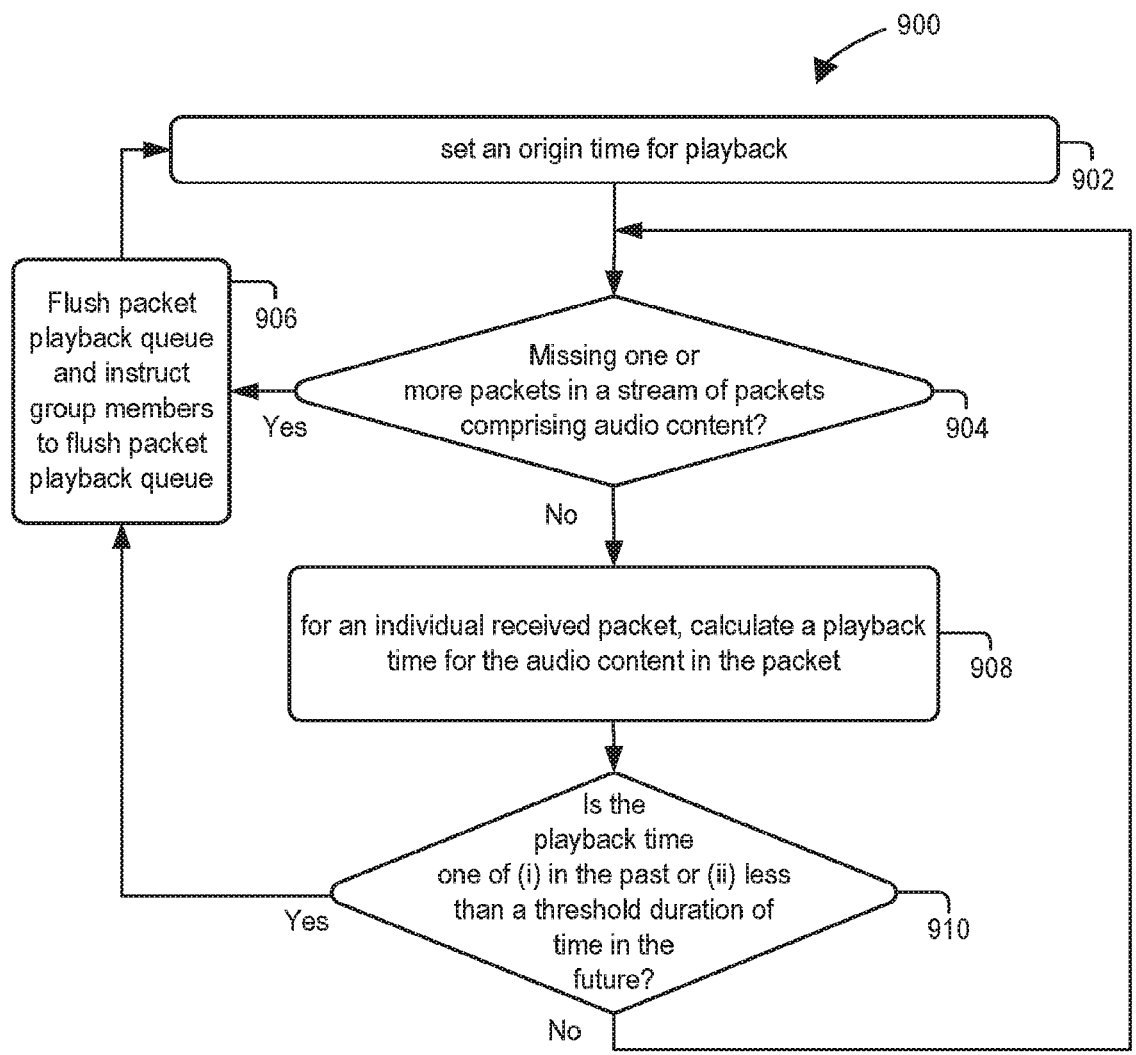
FIG. 9 shows an example method performed by a playback device according to some embodiments.

FIG. 9 shows an example method 900 performed by a playback device according to some embodiments.

The playback device may be the same as or similar to any of the playback devices disclosed and/or described herein, including but not limited to the first playback device 704 described with reference to FIG. 7. In some embodiments, and in example method 900, the playback device is, comprises, or at least performs some functions of a synchrony group coordinator.

Method 900 begins at block 902 which includes the group coordinator setting an origin time for generating playback timing for synchronous playback of audio information contained within a first stream of data packets received from an audio source. As described previously, in some embodiments, the origin time is a reference time from which the group coordinator starts generating playback timing for audio content to be played in synchrony by a synchrony group.

For example, the group coordinator in some embodiments described herein receives a first stream of data comprising a first series of frames (or packets), where an individual frame (or packet) in the first series of frames (or packets) has a first format (e.g., a first packet format and/or a first framing format), and where the first series of frames (or packets) comprises encoded audio data. The group coordinator in some embodiments also generates a second series of frames (or packets), where an individual frame (or packet) in the second series of frames (or packets) has a second framing format (or similar protocol-specific format), and where the second series of frames (or packets) comprises one or more of: (i) portions of the encoded audio data extracted from the first series of frames (or packets), (ii) one or more null portions corresponding to missing portions of the encoded audio data (if any), (iii) playback timing information, where the playback timing information comprises (iii-a) playback timing for the portions of the encoded audio data extracted from the first series of frames (or packets), and (iii-b) one or more playback times for the one or more null portions corresponding to the one or more missing portions of the encoded audio data (if any). In some embodiments, an individual frame (or packet) in the second series of frames (or packets) comprises (i) at least one portion of the encoded audio data extracted from the first series of frames (or packets) and (ii) a playback time for the at least one portion of the encoded audio data extracted from the first series of frames (or packets) contained within the individual frame (or packet) in the second series of frames (or packets).

Next, method 900 advances to block 904, which includes the group coordinator determining whether the first stream of data packets is missing one or more packets. In some embodiments, the group coordinator determines whether the first stream of data packets is missing one or more data packets by analyzing sequence numbers (or other overhead information) in the packets of the first stream of packets. In some embodiments, the group coordinator determining whether the first stream of data packets is missing one or more packets comprises the group coordinator determining whether the first stream of data packets is missing more than a threshold quantity of packets.

If, at block 904, the group coordinator determines that the first stream of data packets (or at least a portion of the first stream that has been received by the group coordinator) is missing more than a threshold quantity of packets, then method 900 advances to block 906 which includes the group coordinator (i) flushing (or otherwise removing, deleting, and/or de-indexing) packets queued for transmission to the synchrony group via the second stream (described above) and/or audio samples queued in a buffer for playback by the group coordinator according to corresponding playback timing previously determined by the group coordinator and/or (ii) instructing the playback devices in the synchrony group (sometimes referred to as the synchrony group members) to each flush audio samples previously received from the group coordinator (via the second stream transmitted to the group members by the group coordinator) queued in their respective buffers for playback according to corresponding playback timing. Then, method 900 returns to block 902, which includes the group coordinator setting a new origin time to resynchronize playback of the audio content by the synchrony group.

But if, at block 904, the group coordinator determines that the first stream of data packets (or at least a portion of the first stream that has been received by the group coordinator) is not missing more than a threshold quantity of packets, then method 904 advances to block 908, which includes the group coordinator determining, for audio content in an individual packet, a playback time for the audio content within the packet. Recall that the playback time is a future time at which playback devices in the synchrony group are to play the audio content within a particular packet (or frame, cell, etc.). In operation, the group coordinator determines a playback time for the audio content in the packet according to any of the methods and/or procedures for determining playback timing disclosed and described herein.

Next, method 900 advances to block 910 which includes the group coordinator determining, for the audio content in an individual packet, whether the determined playback time for that audio content is one of (i) in the past, relative to the clock that the group coordinator uses for playing the audio content or (ii) less than a threshold amount of time into the future. If the playback time for that audio content is in the past, then it is impossible for the playback devices in the synchrony group to play that audio content in synchrony with each other according to the playback time for that audio content. Similarly, if the playback time for that audio content is less than a threshold amount of time in the future, then there may not be sufficient time for the playback devices in the synchrony group to receive, process, and play back that audio content in synchrony with each other. This may happen, for example, if the group coordinator experiences a disruption or delay in the receipt of the first stream of data packets, and then receives a burst of data packets, after which the group coordinator needs to re-order the received burst of packets, extract the audio information from the received burst of packets, generate a second stream of packets comprising portions of the extracted audio information and playback timing for transmission to the other playback devices, and then transmit the second stream of packets to the synchrony group. In such a scenario, there may not be sufficient time for the other playback devices in the synchrony group to receive, process, and play back that audio content in synchrony with each other.

If, at block 910, the group coordinator determines, for the audio content in an individual packet, that the determined playback time for that audio content is one of (i) in the past, relative to the clock that the group coordinator uses for playing the audio content or (ii) less than a threshold amount of time into the future, then method 900 advances to block 906, which includes the group coordinator (i) flushing (or otherwise removing, deleting, and/or de-indexing) packets queued for transmission to the synchrony group via the second stream (described above) and/or audio samples queued in a buffer for playback by the group coordinator according to corresponding playback timing previously determined by the group coordinator and/or (ii) instructing the other synchrony group members to each flush audio samples previously received from the group coordinator (via the second stream transmitted to the group members by the group coordinator) queued in their respective buffers for playback. Then, method 900 returns to block 902, which includes the group coordinator setting a new origin time to resynchronize playback of the audio content by the synchrony group.

But if, at block 910, the group coordinator determines, for the audio content in an individual packet, that the determined playback time for that audio content is not one of (i) in the past, relative to the clock that the group coordinator uses for playing the audio content or (ii) less than a threshold amount of time into the future, then method 900 returns to one of block 904 or block 908. In operation, in some embodiments, the functions of block 904 are happening in parallel or at least substantially in parallel with the functions of blocks 908 and 910. And as a result, the group coordinator determining that either (or both) that the incoming stream is missing one or more packets (or more than a threshold number of incoming packets) and/or that a playback time for one or more portions of audio content is one of in the past or less than a threshold amount of time in the future is sufficient for method 900 to advance to block 906 and then return to block 902.

In this manner, method 900 enables a group coordinator to determine if/when playback resynchronization should occur, and how to resynchronize playback among a group of playback devices configured to play audio content in synchrony with each other as described herein.

VIII. Metadata Exchange Across Multiple Networks

As discussed above, aspects of the present disclosure relate to techniques to exchange metadata associated with media content between multiple devices across multiple networks. For example, a playback device may receive media content and metadata associated with that media content over a PAN, such as a BLUETOOTH network, from a media source. In this example, the playback device may transmit the metadata associated with that media content to one or more other devices (e.g., one or more control devices and/or playback devices) over a WLAN. Additionally, in some instances, the playback device may transmit the media content to one or more other playbacks on the WLAN (e.g., one or more other playback devices designated to playback the media content alone or in synchrony with other playback device(s)). Accordingly, one or more devices that are not connected to the PAN may be provided access to the metadata associated with the media content being transmitted over the PAN.

Figure 10:
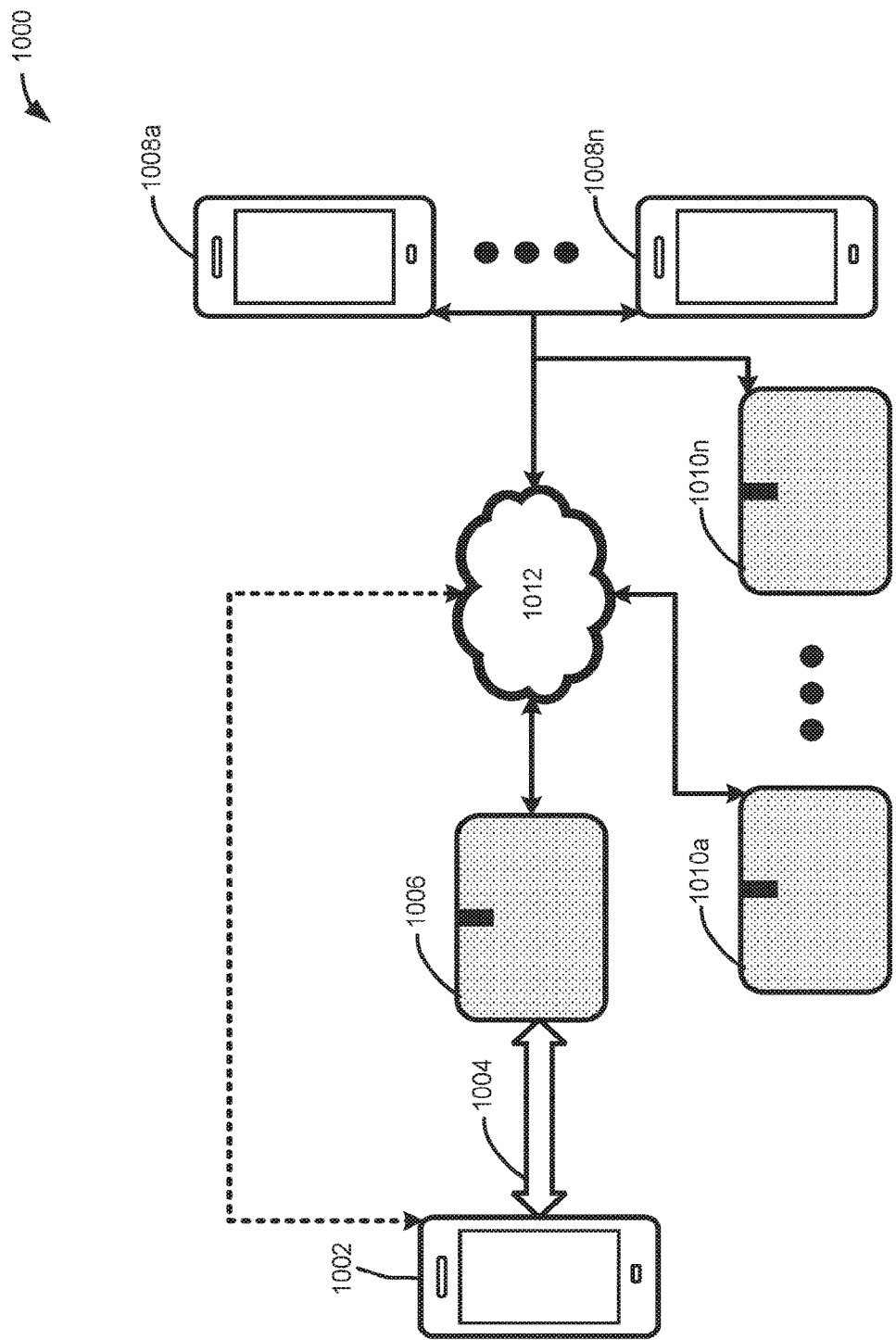
FIG. 10 shows an example configuration of one or more playback devices and one or more control devices exchanging metadata associated with media content.

FIG. 10 shows an example configuration 1000 of one or more playback devices and one or more control devices exchanging metadata associated with media content. As shown, the configuration 1000 comprises a media source device 1002 (e.g., a user device such as a smartphone, a tablet, a laptop, etc.) that communicates with a playback device 1006 over a first network 1004 (e.g., a PAN such as a BLUETOOTH network). The playback device 1006 is also connected to a second network 1012 (e.g., a WLAN such as a WIFI network) to facilitate communication with one or more control devices (e.g., a user device such as a smartphone, a tablet, a laptop, etc.) shown as control devices 1008a-1008n and one or more playback devices shown as playback devices 1010a-1010n. In some instances, the media source device 1002 may also be connected to the second network 1012. In other instances, the media source device 1002 may not be connected to the second network 1012.

The playback device 1006 may receive media content for playback and metadata associated with the media content via the first network 1004 from the media source device. Examples of metadata associated with the media content include: title, artist, album, track length, current seek position within the track, content source (e.g., SPOTIFY, AMAZON MUSIC, APPLE MUSIC, local storage, etc.), and album cover. For instance, in a situation where the user initiates playback of an album on the media source device 1002, the playback device 1006 may receive a first set of metadata associated with the album (e.g., album name, album cover, first track name, first track duration etc.) upon initiation of playback. After initiation of playback, the playback device 1006 may receive additional metadata upon the occurrence of one or more events associated with the media content. For example, upon the current track being changed (e.g., by a user input or naturally after a previous track ends), the playback device 1006 may receive additional metadata such as the name and/or duration of the new track.

After the playback device 1006 receives metadata associated with the media content to be played back, the playback device 1006 may transmit the metadata associated with the media content to one or more of control devices 1008a-n via the second network 1012. In some instances, the playback device 1006 may augment the metadata prior to transmission to the one or more control devices. For example, the metadata received from the media source device 1002 may comprise an album name but not an album cover image. In this example, the playback device 1006 may use the album name to access an associated album cover image from one or more remote servers (e.g., connected to the playback device 1006 over a WAN such as the Internet).

In other instances, the playback device 1006 may relay the metadata associated with the media content to the one or more control devices without augmentation. The one or more of the control devices 1008*a-n* may present the received metadata to a user. For example, the one or more control devices 1008*a-n* may present a graphical user interface (GUI) to a user that includes an indication of which playback device(s) in the media playback system are playing back the media content received via the first network 1004 and/or an indication of what is being played back (e.g., one or more pieces of the metadata associated with the media content).

In some instances, the playback device 1006 may transmit the metadata to one or more other playback devices 1010*a*-1010*n* via the second network 1012. For example, the playback device 1006 may transmit the metadata to all other playback devices connected to the second network 1012 (e.g., all other playback devices in the system). In other examples, the playback device 1006 may only transmit the metadata to a subset of the other playback devices connected to the second network 1012. For illustration, the playback device 1006 may only transmit the metadata to those other playback devices that are currently playing back the media content (e.g., in synchrony with playback device 1006) from the media source device 1002. In another scenario, the playback device 1006 may only transmit the metadata to those other playback devices that have certain characteristics (e.g., those other playback devices that comprise a display or other output device through which the metadata may be communicated to a user).

It should be appreciated that, in some instances, the playback device 1006 may transmit metadata back to the media source device 1002 over the second network 1012. For example, the media source device 1002 may be a user device that executes a software application associated with a media playback system that facilitates playback and control of the playback devices 1006 and/or 1010*a*-1010*n* over the second network 1012. In some cases, this software application may not have direct access to the media content (and/or the associated metadata) being streamed via the first network 1004 (e.g., the media is being streamed from another application on the user device). Thus, the software application may be otherwise unaware that media is being played back on the media playback system. Accordingly, the playback device 1006 may inform such a software application on the user device via the second network 1012.

IX. Conclusion

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example Features (Feature 1) A first playback device comprising: one or more processors; and tangible, non-transitory computer-readable media comprising instructions stored therein, wherein the instructions, when executed, cause the first playback device to perform functions comprising: receiving a first stream of data comprising a first series of frames, wherein an individual packet in the first series of frames has a first format, and wherein the first series of frames comprises encoded audio data; extracting the encoded audio data from the first series of frames; generating a second series of frames, wherein an individual frame in the second series of frames has a second format, and wherein the second series of frames comprises (i) portions of the encoded audio data extracted from the first series of frames and (ii) playback timing information, wherein the playback timing information comprises playback timing for the portions of the encoded audio data extracted from the first series of frames; transmitting a second stream of data comprising the second series of frames to a second playback device; and using the playback timing information to play audio content based on portions of the encoded audio data extracted from the first series of frames in synchrony with the second playback device.

(Feature 2) The first playback device of feature 1, wherein the functions further comprise: determining whether the first series of frames comprising the encoded audio data is missing one or more portions of the encoded audio data; and in response to determining that the first series of frames comprising the encoded audio data is missing one or more portions of the encoded audio data, generating one or more null portions corresponding to the one or more missing portions of the encoded audio data, wherein the second series of frames further comprises the one or more null portions corresponding to the one or more missing portions of the encoded audio data, and wherein the playback timing information further comprises one or more playback times for the one or more null portions corresponding to the one or more missing portions of the encoded audio data.

(Feature 3) The first playback device of feature 2, wherein determining whether the first series of frames comprising the encoded audio data is missing one or more portions of the encoded audio data based on one or more of (i) an analysis of sequence identifiers corresponding to the encoded audio data received via the first stream of data or (ii) an analysis of timestamps corresponding to the encoded audio data received via the first stream of data.

(Feature 4) The first playback device of feature 2, wherein the functions further comprise: informing the second playback device that the second series of frames may comprise more than a threshold quantity of null portions.

(Feature 5) The first playback device of feature 1, wherein the functions further comprise: generating the playback timing information for (i) the portions of the encoded audio data extracted from the first series of frames and (ii) one or more null portions corresponding to one or more missing portions of the encoded audio data.

(Feature 6) The first playback device of feature 5, wherein generating the playback timing information for (i) the portions of the encoded audio data extracted from the first series of frames and (ii) the one or more null portions corresponding to the one or more missing portions of the encoded audio data comprises: generating a playback time for an individual portion of the encoded audio data, wherein the playback time for the individual portion of the encoded audio data comprises a future playback time, relative to a clock at the first playback device, at which the first playback device is to play the individual portion of the encoded audio data; and generating a playback time for an individual null portion, wherein the playback time for the individual null portion comprises a future playback time, relative to the clock at the first playback device, at which the first playback device is to play the individual null portion.

(Feature 7) The first playback device of feature 6, wherein using the playback timing information to play audio content based on the portions of the encoded audio data extracted from the first series of frames in synchrony with the second playback device comprises: playing an individual portion of the encoded audio data extracted from the first series of frames when the clock at the first playback device reaches a time indicated by the playback time for the individual portion of the encoded audio data; and playing an individual null portion when the clock at the first playback device reaches a time indicated by the playback time for the individual null portion.

(Feature 8) The first playback device of feature 1, wherein the first format is associated with a BLUETOOTH transmission protocol, and wherein the second format is associated with a WIFI transmission protocol.

(Feature 9) The first playback device of feature 1, wherein the functions further comprise: informing the second playback device that a time interval between when the second playback device receives one portion of the encoded audio data and when the second playback device receives a subsequent portion of the encoded audio data may exceed a threshold duration.

(Feature 10) The first playback device of feature 1, wherein an individual frame in the second series of frames comprises (i) at least one portion of the encoded audio data extracted from the first series of frames and (ii) a playback time for the at least one portion of the encoded audio data extracted from the first series of frames contained within the individual frame in the second series of frames.

(Feature 11) The first playback device of feature 1, wherein receiving the first stream of data comprising the first series of frames comprises receiving the first stream of data via a first wireless interface, and wherein transmitting the second stream of data comprising the second series of frames to the second playback device comprises transmitting the second stream of data via a second wireless interface.

(Feature 12) Tangible, non-transitory computer-readable media comprising instructions stored therein, wherein the instructions, when executed, cause a first playback device to perform functions comprising: receiving a first stream of data comprising a first series of frames, wherein an individual packet in the first series of frames has a first format, and wherein the first series of frames comprises encoded audio data; extracting the encoded audio data from the first series of frames; generating a second series of frames, wherein an individual frame in the second series of frames has a second format, and wherein the second series of frames comprises (i) portions of the encoded audio data extracted from the first series of frames and (ii) playback timing information, wherein the playback timing information comprises playback timing for the portions of the encoded audio data extracted from the first series of frames; transmitting a second stream of data comprising the second series of frames to a second playback device; and using the playback timing information to play audio content based on portions of the encoded audio data extracted from the first series of frames in synchrony with the second playback device.

(Feature 13) The tangible, non-transitory computer-readable media of feature 12, wherein the functions further comprise: determining whether the first series of frames comprising the encoded audio data is missing one or more portions of the encoded audio data; and in response to determining that the first series of frames comprising the encoded audio data is missing one or more portions of the encoded audio data, generating one or more null portions corresponding to the one or more missing portions of the encoded audio data, wherein the second series of frames further comprises the one or more null portions corresponding to the one or more missing portions of the encoded audio data, and wherein the playback timing information further comprises one or more playback times for the one or more null portions corresponding to the one or more missing portions of the encoded audio data.

(Feature 14) The tangible, non-transitory computer-readable media of feature 13, wherein determining whether the first series of frames comprising the encoded audio data is missing one or more portions of the encoded audio data based on one or more of (i) an analysis of sequence identifiers corresponding to the encoded audio data received via the first stream of data or (ii) an analysis of timestamps corresponding to the encoded audio data received via the first stream of data.

(Feature 15) The tangible, non-transitory computer-readable media of feature 13, wherein the functions further comprise one or more of (i) informing the second playback device that the second series of frames may comprise more than a threshold quantity of null portions or (ii) informing the second playback device that a time interval between when the second playback device receives one portion of the encoded audio data and when the second playback device receives a subsequent portion of the encoded audio data may exceed a threshold duration.

(Feature 16) The tangible, non-transitory computer-readable media of feature 1, wherein the functions further comprise: generating the playback timing information for (i) the portions of the encoded audio data extracted from the first series of frames and (ii) one or more null portions corresponding to one or more missing portions of the encoded audio data.

(Feature 17) The tangible, non-transitory computer-readable media of feature 16, wherein generating the playback timing information for (i) the portions of the encoded audio data extracted from the first series of frames and (ii) the one or more null portions corresponding to the one or more missing portions of the encoded audio data comprises: generating a playback time for an individual portion of the encoded audio data, wherein the playback time for the individual portion of the encoded audio data comprises a future playback time, relative to a clock at the first playback device, at which the first playback device is to play the individual portion of the encoded audio data; and generating a playback time for an individual null portion, wherein the playback time for the individual null portion comprises a future playback time, relative to the clock at the first playback device, at which the first playback device is to play the individual null portion.

(Feature 18) The tangible, non-transitory computer-readable media of feature 17, wherein using the playback timing information to play audio content based on the portions of the encoded audio data extracted from the first series of frames in synchrony with the second playback device comprises: playing an individual portion of the encoded audio data extracted from the first series of frames when the clock at the first playback device reaches a time indicated by the playback time for the individual portion of the encoded audio data; and playing an individual null portion when the clock at the first playback device reaches a time indicated by the playback time for the individual null portion.

(Feature 19) The tangible, non-transitory computer-readable media of feature 12, wherein the first format is associated with a BLUETOOTH transmission protocol, and wherein the second format is associated with a WIFI transmission protocol.

(Feature 20) The tangible, non-transitory computer-readable media of feature 12, wherein an individual frame in the second series of frames comprises (i) at least one portion of the encoded audio data extracted from the first series of frames and (ii) a playback time for the at least one portion of the encoded audio data extracted from the first series of frames contained within the individual frame in the second series of frames.

(Feature 21) A first playback device comprising: a first wireless communication interface configured to facilitate communication over at least one Personal Area Network (PAN); a second wireless communication interface configured to facilitate communication over at least one Wireless Local Area Network (WLAN); one or more processors; at least one non-transitory computer-readable medium comprising program instructions that are executable by the at least one processor such that the first playback device is configured to: receive, using the first wireless communication interface, a first stream of data comprising a first series of frames from a first user device, wherein an individual packet in the first series of frames has a first format, and wherein the first series of frames comprises encoded audio data; extract the encoded audio data from the first series of frames; generate a second series of frames, wherein an individual frame in the second series of frames has a second format, and wherein the second series of frames comprises (i) portions of the encoded audio data extracted from the first series of frames and (ii) playback timing information, wherein the playback timing information comprises playback timing for the portions of the encoded audio data extracted from the first series of frames; transmit, using the second wireless communication interface, a second stream of data comprising the second series of frames to a second playback device; and use the playback timing information to play audio content based on portions of the encoded audio data extracted from the first series of frames in synchrony with the second playback device.

(Feature 22) The first playback device of feature 21, wherein the first format is associated with a BLUETOOTH transmission protocol, and wherein the second format is associated with a WIFI transmission protocol.

(Feature 23) The first playback device of any of features 21 and 22, wherein an individual frame in the second series of frames comprises (i) at least one portion of the encoded audio data extracted from the first series of frames and (ii) a playback time for the at least one portion of the encoded audio data extracted from the first series of frames contained within the individual frame in the second series of frames.

(Feature 24) The first playback device of any of features 21-23, wherein the at least one non-transitory computer-readable medium further comprises program instructions that are executable by the at least one processor such that the first playback device is configured to: receive, using the first communication interface, first metadata associated with the encoded audio content from the first user device; and based on the first metadata, transmit second metadata associated with the encoded audio content to a second user device using the second communication interface.

(Feature 25) The first playback device of feature 24, wherein at least one of the first metadata or the second metadata comprises at least one of: an artist name, a song title, song art, song duration, an album title, album art, or album duration.

(Feature 26) The first playback device of any of features 24 and 25, wherein the first metadata is the same as the second metadata.

(Feature 27) The first playback device of any of features 24 and 25, wherein the first metadata is different from the second metadata.

(Feature 28) The first playback device of any of features 21-27, wherein the at least one non-transitory computer-readable medium further comprises program instructions that are executable by the at least one processor such that the first playback device is configured to: determine whether the first series of frames comprising the encoded audio data is missing one or more portions of the encoded audio data; and in response to a determination that the first series of frames comprising the encoded audio data is missing one or more portions of the encoded audio data, generate one or more null portions corresponding to the one or more missing portions of the encoded audio data, wherein the second series of frames further comprises the one or more null portions corresponding to the one or more missing portions of the encoded audio data, and wherein the playback timing information further comprises one or more playback times for the one or more null portions corresponding to the one or more missing portions of the encoded audio data.

(Feature 29) The first playback device of feature 28, wherein the program instructions that are executable by the at least one processor such that the first playback device is configured to determine whether the first series of frames comprising the encoded audio data is missing one or more portions of the encoded audio data comprises program instructions that are executable by the at least one processor such that the first playback device is configured to: determine whether the first series of frames comprising the encoded audio data is missing one or more portions of the encoded audio data based on one or more of (i) an analysis of sequence identifiers corresponding to the encoded audio data received via the first stream of data or (ii) an analysis of timestamps corresponding to the encoded audio data received via the first stream of data.

(Feature 30) The first playback device of any of features 21-29, wherein the at least one non-transitory computer-readable medium further comprises program instructions that are executable by the at least one processor such that the first playback device is configured to: generate the playback timing information for (i) the portions of the encoded audio data extracted from the first series of frames and (ii) one or more null portions corresponding to one or more missing portions of the encoded audio data.

(Feature 31) The first playback device of feature 30, wherein the program instructions that are executable by the at least one processor such that the first playback device is configured to generate the playback timing information comprises program instructions that are executable by the at least one processor such that the first playback device is configured to: generate a playback time for an individual portion of the encoded audio data, wherein the playback time for the individual portion of the encoded audio data comprises a future playback time, relative to a clock at the first playback device, at which the first playback device is to play the individual portion of the encoded audio data; and generate a playback time for an individual null portion, wherein the playback time for the individual null portion comprises a future playback time, relative to the clock at the first playback device, at which the first playback device is to play the individual null portion.

(Feature 32) The first playback device of any of features 21-31, wherein the program instructions that are executable by the at least one processor such that the first playback device is configured to use the playback timing information to play audio content comprises program instructions that are executable by the at least one processor such that the first playback device is configured to: play an individual portion of the encoded audio data extracted from the first series of frames when the clock at the first playback device reaches a time indicated by the playback time for the individual portion of the encoded audio data; and play an individual null portion when the clock at the first playback device reaches a time indicated by the playback time for the individual null portion.

(Feature 33) The first playback device of any of features 21-32, wherein an individual frame in the second series of frames comprises (i) at least one portion of the encoded audio data extracted from the first series of frames and (ii) a playback time for the at least one portion of the encoded audio data extracted from the first series of frames contained within the individual frame in the second series of frames.

(Feature 34) A method of operating a first playback device, the method comprising: receiving, using a first communication interface configured to facilitate communication over at least one personal area network, a first stream of data comprising a first series of frames, wherein an individual packet in the first series of frames has a first format, and wherein the first series of frames comprises encoded audio data; extracting the encoded audio data from the first series of frames; generating a second series of frames, wherein an individual frame in the second series of frames has a second format, and wherein the second series of frames comprises (i) portions of the encoded audio data extracted from the first series of frames and (ii) playback timing information, wherein the playback timing information comprises playback timing for the portions of the encoded audio data extracted from the first series of frames; transmitting, using a second communication interface configured to facilitate communication over at least one wireless local area network, a second stream of data comprising the second series of frames to a second playback device; and using the playback timing information to play audio content based on portions of the encoded audio data extracted from the first series of frames in synchrony with the second playback device.

(Feature 35) At least one non-transitory computer-readable medium comprising program instructions that are executable by at least one processor such that a first playback device is configured to: receive, using a first wireless communication interface of the first playback device, a first stream of data comprising a first series of frames from a first user device, wherein an individual packet in the first series of frames has a first format, and wherein the first series of frames comprises encoded audio data; extract the encoded audio data from the first series of frames; generate a second series of frames, wherein an individual frame in the second series of frames has a second format, and wherein the second series of frames comprises (i) portions of the encoded audio data extracted from the first series of frames and (ii) playback timing information, wherein the playback timing information comprises playback timing for the portions of the encoded audio data extracted from the first series of frames; transmit, using a second wireless communication interface of the first playback device, a second stream of data comprising the second series of frames to a second playback device; and use the playback timing information to play audio content based on portions of the encoded audio data extracted from the first series of frames in synchrony with the second playback device.

(Feature 36) The at least one non-transitory computer-readable medium of feature 35, wherein an individual frame in the second series of frames comprises (i) at least one portion of the encoded audio data extracted from the first series of frames and (ii) a playback time for the at least one portion of the encoded audio data extracted from the first series of frames contained within the individual frame in the second series of frames.

(Feature 37) The at least one non-transitory computer-readable medium of any of features 35 and 36, wherein the at least one non-transitory computer-readable medium further comprises program instructions that are executable by the at least one processor such that the first playback device is configured to: receive, using the first communication interface, first metadata associated with the encoded audio content from the first user device; and based on the first metadata, transmit second metadata associated with the encoded audio content to a second user device using the second communication interface.

(Feature 38) The at least one non-transitory computer-readable medium of feature 37, wherein at least one of the first metadata or the second metadata comprises at least one of: an artist name, a song title, song art, song duration, an album title, album art, or album duration.

(Feature 39) The at least one non-transitory computer-readable medium of any of features 37 and 38, wherein the first metadata is the same as the second metadata.

(Feature 40) The at least one non-transitory computer-readable medium of any of features 37 and 38, wherein the first metadata is different from the second metadata.

(Feature 41) A first playback device comprising: a first wireless communication interface configured to facilitate communication over at least one Personal Area Network (PAN); a second wireless communication interface configured to facilitate communication over at least one Wireless Local Area Network (WLAN); one or more processors; at least one non-transitory computer-readable medium comprising program instructions that are executable by the at least one processor such that the first playback device is configured to: receive, using the first wireless communication interface, a first stream of data comprising a first series of frames from a first user device, wherein an individual packet in the first series of frames has a first format, and wherein the first series of frames comprises encoded audio data; extract the encoded audio data from the first series of frames; generate a second series of frames, wherein an individual frame in the second series of frames has a second format, and wherein the second series of frames comprises (i) portions of the encoded audio data extracted from the first series of frames and (ii) playback timing information, wherein the playback timing information comprises playback timing for the portions of the encoded audio data extracted from the first series of frames; transmit, using the second wireless communication interface, a second stream of data comprising the second series of frames to a second playback device; receive, using the first communication interface, first metadata associated with the encoded audio content from the first user device; and based on the first metadata, transmit second metadata associated with the encoded audio content to a second user device using the second communication interface.

(Feature 42) The first playback device of feature 41, wherein the first playback device does not playback the playback audio content based on the encoded audio data.

(Feature 43) The first playback device of feature 41, wherein the first playback device plays back audio content based on portions of the encoded audio data at a minimum volume level (e.g., a volume level of zero, muted, etc.).

(Feature 44) The first playback device of any of features 21-33 and 41-43, wherein the first playback device is a portable playback device that comprises a battery.

(Feature 45) The first playback device of any of features 21-33 and 41-43, wherein the first playback device is a wearable device configured to be worn about a portion of a subject.

(Feature 46) The first playback device of feature 45, wherein the first playback device is a headphone device.

(Feature 47) The first playback of any of features 21-33 and 41-46, wherein the first playback devices is a screenless playback device (e.g., does not comprise a display screen).

What is claimed is:

1. A first playback device comprising:
a first wireless communication interface configured to facilitate communication over at least one Personal Area Network (PAN);
a second wireless communication interface configured to facilitate communication over at least one Wireless Local Area Network (WLAN);
one or more processors;
at least one non-transitory computer-readable medium comprising program instructions that are executable by the one or more processors such that the first playback device is configured to:
receive, using the first wireless communication interface, a first stream of data comprising a first series of frames from a first user device, wherein an individual packet in the first series of frames has a first format, and wherein the first series of frames comprises encoded audio data;
extract the encoded audio data from the first series of frames;
generate a second series of frames, wherein an individual frame in the second series of frames has a second format, and wherein the second series of frames comprises (i) portions of the encoded audio data extracted from the first series of frames and (ii) playback timing information starting from a reference start time, wherein the playback timing information comprises playback timing for the portions of the encoded audio data extracted from the first series of frames;
transmit, using the second wireless communication interface, a second stream of data comprising the second series of frames to a second playback device;
use the playback timing information to play audio content based on portions of the encoded audio data extracted from the first series of frames in synchrony with the second playback device;
while playing the audio content in synchrony with the second playback device based on the portions of the encoded audio data extracted from the first series of frames in synchrony with the second playback device, determine whether the first series of frames comprising the encoded audio data is missing more than a threshold number of portions of the encoded audio data; and
when the first series of frames is missing more than the threshold number of portions of the encoded audio data, resynchronize playback of the audio content with the second playback device, wherein resynchronizing playback of the audio content with the second playback device comprises (i) deleting at least one of (a) packets queued for transmission to the second playback device or (b) audio data extracted from the first series of frames queued in a buffer for playback by the first playback device, (ii) sending one or more commands to the second playback device to cause the second playback device to delete at least some of its current buffer of the second series of audio frames queued for playback, and (iii) resetting the reference start time from which to restart generating playback timing information for the second series of frames.

2. The first playback device of claim 1, wherein the first format is associated with a BLUETOOTH transmission protocol, and wherein the second format is associated with a WIFI transmission protocol.

3. The first playback device of claim 1, wherein an individual frame in the second series of frames comprises (i) at least one portion of the encoded audio data extracted from the first series of frames and (ii) a playback time for the at least one portion of the encoded audio data extracted from the first series of frames contained within the individual frame in the second series of frames.

4. The first playback device of claim 1, wherein the at least one non-transitory computer-readable medium further comprises program instructions that are executable by the one or more processors such that the first playback device is configured to:
receive, using the first wireless communication interface, first metadata associated with the encoded audio data from the first user device; and based on the first metadata, transmit second metadata associated with the encoded audio data to a second user device using the second wireless communication interface.

5. The first playback device of claim 4, wherein at least one of the first metadata or the second metadata comprises at least one of an artist name, a song title, song art, song duration, an album title, album art, or album duration.

6. The first playback device of claim 4, wherein the first metadata is the same as the second metadata.

7. The first playback device of claim 4, wherein the first metadata is different from the second metadata.

8. The first playback device of claim 1, wherein the at least one non-transitory computer-readable medium further comprises program instructions that are executable by the one or more processors such that the first playback device is configured to:
   determine whether the first series of frames comprising the encoded audio data is missing one or more portions of the encoded audio data; and
   in response to a determination that the first series of frames comprising the encoded audio data is missing one or more portions of the encoded audio data, generate one or more null portions corresponding to the missing one or more portions of the encoded audio data, wherein the second series of frames further comprises the one or more null portions corresponding to the missing one or more portions of the encoded audio data, and wherein the playback timing information further comprises one or more playback times for the one or more null portions corresponding to the missing one or more portions of the encoded audio data.

9. The first playback device of claim 8, wherein the program instructions that are executable by the one or more processors such that the first playback device is configured to determine whether the first series of frames comprising the encoded audio data is missing one or more portions of the encoded audio data comprise program instructions that are executable by the one or more processors such that the first playback device is configured to:
   determine whether the first series of frames comprising the encoded audio data is missing one or more portions of the encoded audio data based on one or more of (i) an analysis of sequence identifiers corresponding to the encoded audio data received via the first stream of data or (ii) an analysis of timestamps corresponding to the encoded audio data received via the first stream of data.

10. The first playback device of claim 1, wherein the at least one non-transitory computer-readable medium further comprises program instructions that are executable by the one or more processors such that the first playback device is configured to:
    generate the playback timing information for (i) the portions of the encoded audio data extracted from the first series of frames and (ii) one or more null portions corresponding to one or more missing portions of the encoded audio data.

11. The first playback device of claim 10, wherein the program instructions that are executable by the one or more processors such that the first playback device is configured to generate the playback timing information comprise program instructions that are executable by the one or more processors such that the first playback device is configured to:
    generate a playback time for an individual portion of the encoded audio data, wherein the playback time for the individual portion of the encoded audio data comprises a future playback time, relative to a clock at the first playback device, at which the first playback device is to play the individual portion of the encoded audio data; and
    generate a playback time for an individual null portion, wherein the playback time for the individual null portion comprises a future playback time, relative to the clock at the first playback device, at which the first playback device is to play the individual null portion.

12. The first playback device of claim 11, wherein the program instructions that are executable by the one or more processors such that the first playback device is configured to use the playback timing information to play audio content based on portions of the encoded audio data extracted from the first series of frames in synchrony with the second playback device comprise program instructions that are executable by the one or more processors such that the first playback device is configured to:
    play an individual portion of the encoded audio data extracted from the first series of frames when the clock at the first playback device reaches a time indicated by the playback time for the individual portion of the encoded audio data; and
    play an individual null portion when the clock at the first playback device reaches a time indicated by the playback time for the individual null portion.

13. The first playback device of claim 1, wherein an individual frame in the second series of frames comprises (i) at least one portion of the encoded audio data extracted from the first series of frames and (ii) a playback time for the at least one portion of the encoded audio data extracted from the first series of frames contained within the individual frame in the second series of frames.

14. A method of operating a first playback device, the method comprising:
    receiving, using a first wireless communication interface configured to facilitate communication over at least one personal area network, a first stream of data comprising a first series of frames, wherein an individual packet in the first series of frames has a first format, and wherein the first series of frames comprises encoded audio data;
    extracting the encoded audio data from the first series of frames;
    generating a second series of frames, wherein an individual frame in the second series of frames has a second format, and wherein the second series of frames comprises (i) portions of the encoded audio data extracted from the first series of frames and (ii) playback timing information starting from a reference start time, wherein the playback timing information comprises playback timing for the portions of the encoded audio data extracted from the first series of frames;
    transmitting, using a second wireless communication interface configured to facilitate communication over at least one wireless local area network, a second stream of data comprising the second series of frames to a second playback device;
    using the playback timing information to play audio content based on portions of the encoded audio data extracted from the first series of frames in synchrony with the second playback device;
    while playing the audio content in synchrony with the second playback device based on the portions of the encoded audio data extracted from the first series of frames in synchrony with the second playback device, determining whether the first series of frames comprising the encoded audio data is missing more than a threshold number of portions of the encoded audio data; and when the first series of frames is missing more than the threshold number of portions of the encoded audio data, resynchronizing playback of the audio content with the second playback device, wherein resynchronizing playback of the audio content with the second playback device comprises (i) deleting at least one of (a) packets queued for transmission to the second playback device or (b) audio data extracted from the first series of frames queued in a buffer for playback by the first playback device, (ii) sending one or more commands to the second playback device to cause the second playback device to delete at least some of its current buffer of the second series of audio frames queued for playback, and (iii) resetting the reference start time from which to restart generating playback timing information for the second series of frames.

15. Tangible, non-transitory computer-readable media comprising program instructions that are executable by at least one processor such that a first playback device is configured to:

receive, using a first wireless communication interface of the first playback device, a first stream of data comprising a first series of frames from a first user device, wherein an individual packet in the first series of frames has a first format, and wherein the first series of frames comprises encoded audio data;

extract the encoded audio data from the first series of frames;

generate a second series of frames, wherein an individual frame in the second series of frames has a second format, and wherein the second series of frames comprises (i) portions of the encoded audio data extracted from the first series of frames and (ii) playback timing information starting from a reference start time, wherein the playback timing information comprises playback timing for the portions of the encoded audio data extracted from the first series of frames;

transmit, using a second wireless communication interface of the first playback device, a second stream of data comprising the second series of frames to a second playback device;

use the playback timing information to play audio content based on portions of the encoded audio data extracted from the first series of frames in synchrony with the second playback device;

while playing the audio content in synchrony with the second playback device based on the portions of the encoded audio data extracted from the first series of frames in synchrony with the second playback device, determine whether the first series of frames comprising the encoded audio data is missing more than a threshold number of portions of the encoded audio data; and when the first series of frames is missing more than the threshold number of portions of the encoded audio data, resynchronize playback of the audio content with the second playback device, wherein resynchronizing playback of the audio content with the second playback device comprises (i) deleting at least one of (a) packets queued for transmission to the second playback device or (b) audio data extracted from the first series of frames queued in a buffer for playback by the first playback device, (ii) sending one or more commands to the second playback device to cause the second playback device to delete at least some of its current buffer of the second series of audio frames queued for playback, and (iii) resetting the reference start time from which to restart generating playback timing information for the second series of frames.

16. The tangible, non-transitory computer-readable media of claim 15, wherein an individual frame in the second series of frames comprises (i) at least one portion of the encoded audio data extracted from the first series of frames and (ii) a playback time for the at least one portion of the encoded audio data extracted from the first series of frames contained within the individual frame in the second series of frames.

17. The tangible, non-transitory computer-readable media of claim 15, wherein the program instructions comprise further program instructions that are executable by the at least one processor such that the first playback device is further configured to:

receive, using the first wireless communication interface, first metadata associated with the encoded audio data from the first user device; and based on the first metadata, transmit second metadata associated with the encoded audio data to a second user device using the second wireless communication interface.

18. The tangible, non-transitory computer-readable media of claim 17, wherein at least one of the first metadata or the second metadata comprises at least one of an artist name, a song title, song art, song duration, an album title, album art, or album duration.

19. The tangible, non-transitory computer-readable media of claim 17, wherein the first metadata is the same as the second metadata.

20. The tangible, non-transitory computer-readable media of claim 17, wherein the first metadata is different from the second metadata.

* * * * *